(12) United States Patent
Mazzarelli et al.

(10) Patent No.: US 10,800,230 B2
(45) Date of Patent: Oct. 13, 2020

(54) UTILITY TERRAIN VEHICLE DOOR ASSEMBLY

(71) Applicant: Commercial Sewing, Inc., Torrington, CT (US)

(72) Inventors: David Mazzarelli, Torrington, CT (US); Nicholas Cegelka, Naugatuck, CT (US)

(73) Assignee: COMMERCIAL SEWING, INC., Torrington, CT (US)

( * ) Notice: Subject to any disclaimer, the term of this patent is extended or adjusted under 35 U.S.C. 154(b) by 0 days.

(21) Appl. No.: 15/893,098

(22) Filed: Feb. 9, 2018

(65) Prior Publication Data

US 2018/0229591 A1  Aug. 16, 2018

Related U.S. Application Data

(60) Provisional application No. 62/458,655, filed on Feb. 14, 2017, provisional application No. 62/509,332, filed on May 22, 2017.

(51) Int. Cl.
| | |
|---|---|
| *B60J 1/08* | (2006.01) |
| *B60J 5/04* | (2006.01) |
| *B60J 1/14* | (2006.01) |
| *B62D 21/18* | (2006.01) |

(52) U.S. Cl.
CPC .............. *B60J 5/0486* (2013.01); *B60J 1/085* (2013.01); *B60J 1/14* (2013.01); *B60J 5/047* (2013.01); *B60J 5/0487* (2013.01); *B62D 21/183* (2013.01)

(58) Field of Classification Search
CPC ......... E05Y 2900/55; B60J 10/75; B60J 1/17; B60J 10/79; B60J 1/14; F25D 17/045; F25D 2400/04; F25D 17/065; F25D 2317/0653; A47B 46/00
See application file for complete search history.

(56) References Cited

U.S. PATENT DOCUMENTS

| | | | | |
|---|---|---|---|---|
| 2,682,427 | A * | 6/1954 | Bright ................... | B60J 5/0487 296/148 |
| 6,036,255 | A * | 3/2000 | Lester ................... | B60J 5/0416 296/146.1 |
| 6,036,256 | A * | 3/2000 | Hilliard ................. | B60J 1/08 160/182 |

(Continued)

OTHER PUBLICATIONS

Honda Powersports Website; "Fabric Front Doors (Black)", http://shop.powersports.honda.com/p/fabric-front-doors-black-1/accessories_xsx_rec-utility_pioneer-700-4_2014?pp=24, Date Accessed: May 14, 2020.

(Continued)

*Primary Examiner* — Kiran B Patel
(74) *Attorney, Agent, or Firm* — Cantor Colburn LLP

(57) ABSTRACT

A utility task vehicle includes a vehicle body including an opening. A door is positioned adjacent the opening. The door is configured to pivot about a first axis between an open position and a closed position. A window assembly is positioned adjacent and operably coupled to the door. The window assembly is configured to pivot about a second axis between an open position and a closed position. Rotation of the window assembly about the second axis is driven by rotation of said door about the first axis. In combination, the door and the window assembly substantially seal the opening of the vehicle body.

9 Claims, 26 Drawing Sheets

(56) References Cited

U.S. PATENT DOCUMENTS

| | | | | |
|---|---|---|---|---|
| 6,073,989 | A * | 6/2000 | Hilliard | B60J 1/1815 296/146.1 |
| 6,134,841 | A * | 10/2000 | Schneider | B60J 5/0487 296/190.11 |
| 6,149,228 | A * | 11/2000 | O'Neill | B60R 21/131 296/190.01 |
| 6,206,454 | B1 * | 3/2001 | Cory | B60J 7/10 160/273.1 |
| 6,886,881 | B1 * | 5/2005 | Henderson | B60J 1/08 296/146.2 |
| 7,216,926 | B2 * | 5/2007 | Hampel | B62D 29/043 296/102 |
| 8,720,977 | B2 * | 5/2014 | Nakamura | B60J 5/0405 296/146.2 |
| 9,016,760 | B2 * | 4/2015 | Kuroda | B60R 21/06 296/146.5 |
| 9,365,241 | B1 * | 6/2016 | Taracko | B62D 23/005 |
| 9,387,746 | B2 * | 7/2016 | Rutland | B60J 11/06 |
| 9,475,367 | B1 * | 10/2016 | Wilson, III | B60J 5/0487 |
| 10,144,273 | B2 * | 12/2018 | Carlson | B60J 7/10 |
| 2006/0087145 | A1 * | 4/2006 | Curtis, Jr. | B60J 5/0487 296/80 |
| 2006/0087150 | A1 * | 4/2006 | Curtis, Jr. | B60J 5/0487 296/146.1 |
| 2007/0182204 | A1 * | 8/2007 | Curtis, Jr. | B60J 5/0487 296/146.11 |
| 2008/0093883 | A1 * | 4/2008 | Shibata | B60J 5/0487 296/146.9 |
| 2011/0156438 | A1 * | 6/2011 | Ichihara | B60J 1/00 296/181.1 |
| 2011/0254314 | A1 * | 10/2011 | Renard | B60J 1/04 296/190.1 |
| 2013/0199097 | A1 * | 8/2013 | Spindler | B60J 5/047 49/394 |
| 2014/0292039 | A1 | 10/2014 | Kuroda et al. | |
| 2014/0306487 | A1 * | 10/2014 | Dobrot | B60J 5/0487 296/190.03 |
| 2015/0175114 | A1 * | 6/2015 | Schroeder | B60R 21/06 296/190.03 |
| 2017/0204643 | A1 * | 7/2017 | Borth | E05D 5/0207 |
| 2017/0282696 | A1 * | 10/2017 | Mazzarelli | B62D 25/06 |
| 2019/0061490 | A1 * | 2/2019 | Getzschman | B60J 5/0487 |
| 2019/0211915 | A1 * | 7/2019 | Davis | B62D 21/18 |
| 2019/0275952 | A1 * | 9/2019 | Bennett | B60R 11/00 |

OTHER PUBLICATIONS

Honda Powersports Website; "Rear Doors (Black)", http://shop.powersports.honda.com/p/rear-doors-black?p=24. Date Accessed: May 14, 2020.

* cited by examiner

UTILITY TERRAIN VEHICLE DOOR ASSEMBLY

CROSS-REFERENCE TO RELATED APPLICATIONS

This application claims the benefit of U.S. Provisional Application Ser. No. 62/458,655, filed Feb. 14, 2017 and U.S. Provisional Application Ser. No. 62/509,332, filed May 22, 2017, which are incorporated herein by reference in their entirety.

BACKGROUND

Exemplary embodiments of the present disclosure relate to a door assembly of a utility all-terrain vehicle, and more particularly, to a gull wing door assembly for a utility all-terrain vehicle.

Utility task vehicles, also referred to as UTVs, are increasing in popularity due to their versatility. UTVs may be used for many recreational and work purposes, such as trail riding, racing, cargo hauling, and transportation. UTV's typically include an open cage built around a cab for protecting the passengers in the UTV and for providing strength and maintaining the structural integrity of the UTV during a crash or rollover event. Some UTVs are manufactured to include a door mounted to the chassis to further protect the passengers in the UTV. However, these doors extend over only a portion of the height of the vehicle and therefore fail to protect passengers within the UTV not only from the elements, but also form debris that may be encountered during operation of the UTV.

SUMMARY

In one embodiment, a utility task vehicle includes a vehicle body including an opening. A door is positioned adjacent the opening. The door is configured to pivot about a first axis between an open position and a closed position. A window assembly is positioned adjacent and operably coupled to the door. The window assembly is configured to pivot about a second axis between an open position and a closed position. Rotation of the window assembly about the second axis is driven by rotation of said door about the first axis. In combination, the door and the window assembly substantially seal the opening of the vehicle body.

In another embodiment, a utility task vehicle includes a vehicle body having a chassis and a roll cage defining an opening. A window assembly is directly coupled to the roll cage adjacent the opening. The window assembly is rotatable about an axis between a closed position and an open position.

In another embodiment, a method of exiting a utility task vehicle includes rotating a door about a first axis from a closed position to an open position. A window assembly is rotated about a second axis from a closed position to an open position. The door is fixedly mounted to the window assembly such that the door and the window assembly rotate about said first axis and said second axis together.

BRIEF DESCRIPTION OF THE DRAWINGS

The foregoing and other features and advantages of embodiments are apparent from the following detailed description, taken in conjunction with the accompanying drawings, in which.

The detailed description describes exemplary embodiments, together with some of the advantages and features thereof, by way of example with reference to the drawings.

DETAILED DESCRIPTION

Figure 1:
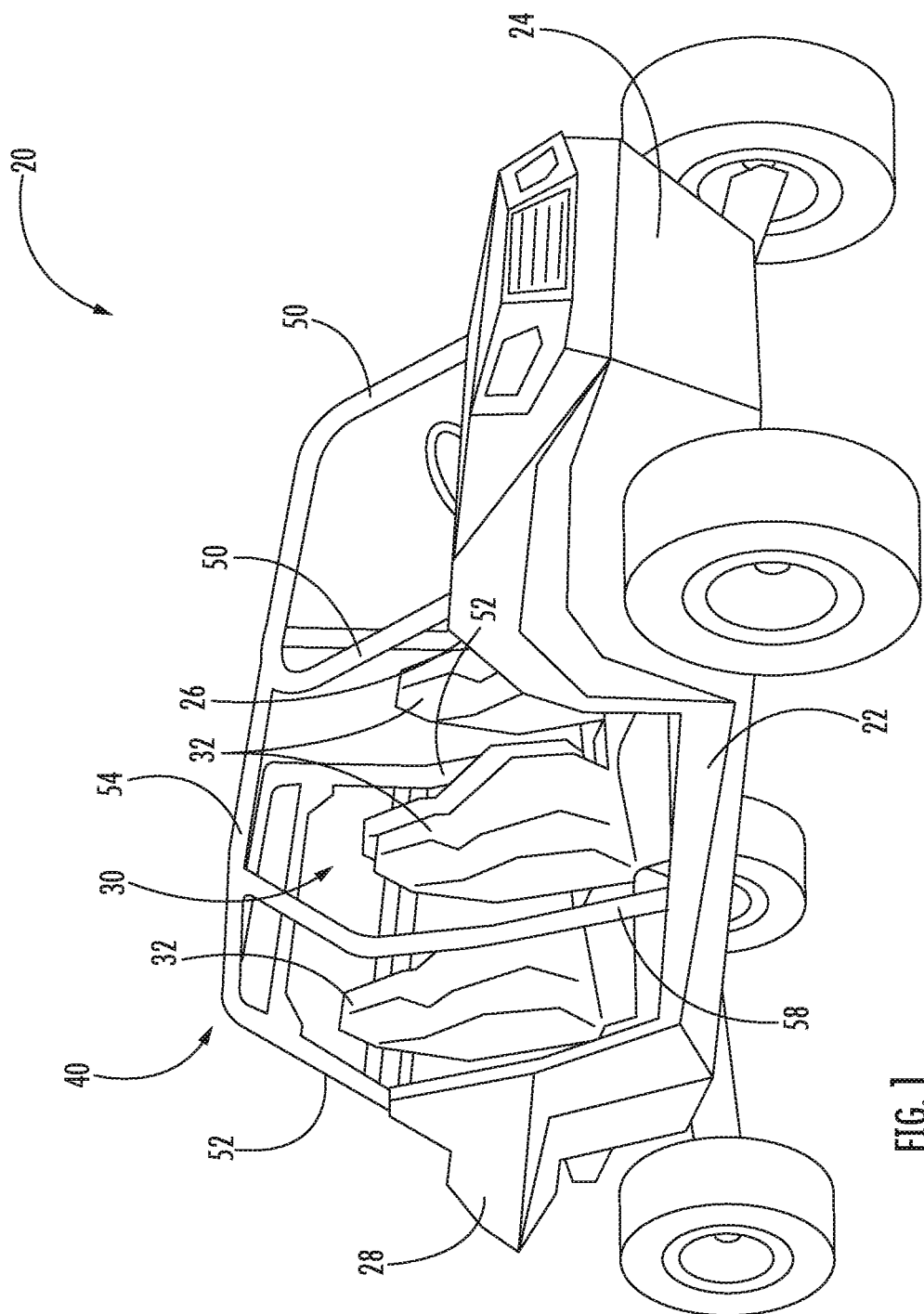
FIG. 1 is a perspective view of an example of a utility vehicle.

Referring now to the FIGS., an example of a utility task vehicle (UTV) is illustrated in FIG. 1. It should be understood that the term "utility task vehicle" or UTV as used herein is intended to include any suitable vehicle, including, but not limited to, a side by side vehicle (SxS), a recreation terrain vehicle (RTV), a recreational off highway vehicle (ROV or ROHV), and a multipurpose off highway utility vehicle (MOHUV). The UTV 20 includes a vehicle body comprising a chassis 22 supported by a plurality of ground engaging members, such as wheels including tires for example. The chassis 22 forms the body of the vehicle 20 including a front fender 24, dashboard 26, rear fender 28, and floor board (not shown). The chassis 22 similarly defines a seating area 30 within which at least one person may be seated to operate the UTV 20. In an embodiment, the seating area 30 includes two seats 32 arranged in a side-by-side configuration. In another embodiment, illustrated in FIG. 1, the seating area 30 includes a first row containing at least one seat 32 and a second row disposed behind the first row, containing at least one seat. It should be understood, that embodiments where the seating area 30 of the UTV 20 includes any number of rows and seats are also within the scope of the disclosure. In some embodiments, the UTV 20 may include a substantially open rear cargo area 34 arranged behind the seating area 30.

The vehicle body additionally includes a roll cage 40 configured to cooperate with the chassis 22 to define an interior of the UTV 20. The roll cage 40 is positioned generally adjacent to and surrounding the seating area 30. In addition, in embodiments where the UTV 20 includes a rear cargo area 34, the roll cage 40 may, but need not, surround at least a portion of the rear cargo area 34. The roll cage 40 is generally made from a strong, durable material, such as a metal or composite for example, and is intended to protect the passengers or cargo located therein in the event of a rollover or crash.

The roll cage 40 typically includes a similar left section 42 and right section 44 spaced apart from one another. The left and right sections 42, 44 may but need not be arranged parallel to one another. Alternatively, or in addition, the left section 42 and the right section 44 may be symmetrical about a vertically oriented plane extending longitudinally through the chassis 22 of the vehicle 20. Each of the left and right sections 42, 44 includes a front pillar 50 and a rear pillar 52 extending vertically or at an angle from the chassis 22. The front and rear pillar 50, 52 of each section 42, 44 are connected via a connecting pillar 54. In one embodiment, the front pillar 50, connecting pillar 54, and rear pillar 52 of a respective section 42, 44 of the roll cage 40 are integrally formed by bending a post, pipe, or other structural member. For added stability, one or more cross-bars 56 may extend between and couple the left and right sections 42, 44 of the roll cage 40. For example, a front cross-bar 56 may be arranged generally adjacent an upper edge of the windshield 26 and a rear cross-bar 56 may connect the rear posts 52 of the left and right sections 42, 44.

In some embodiments, each section 42, 44 of roll cage 40 additionally includes an intermediate pillar 58, located at a position between the front and rear pillars 50, 52. The intermediate pillar 58 extends from the chassis 22 and connects to a portion of the connecting pillar 54 between the front and rear pillars 50, 52. Accordingly, a first portion of the roll cage 40 is defined between the front and intermediate pillars 50, 58 and a second portion of the roll cage 40 is defined between the intermediate pillars 58 and the rear pillars 52. In some embodiments where the UTV 20 includes multiple rows within the seating area 30 (FIGS.), a first row of seating is associated with the first portion of the roll cage 40, and a second row of seating is associated with the second portion of the roll cage 40. In some embodiments where the UTV 20 includes a rear cargo area 34, the seating area 30 may be associated with the first portion of the roll cage 40, and the cargo area 34 may be associated with the second portion of the roll cage 40.

The UTV 20 includes one or more doors assemblies 60, for example mounted to the chassis 22, which provide access to at least one of the seating area 30 and the rear cargo area 34. Each door assembly 60 includes a door 62 that may be a standard component of the UTV 20 provided by the original equipment manufacturer. The door 62 has a height substantially similar to the remainder of the chassis 22 such that the door 62 selectively seals a portion of an adjacent opening 64 defined by the chassis 22 and the roll cage 40. Regardless of its location about the body, the door 62 typically includes one or more hinges 66 mounted adjacent to an edge 68 thereof such that the door 62 is pivotable about an axis X defined by the hinges 66. When the door 62 is mounted adjacent the seating area 30, the axis of rotation X may be oriented generally vertically such as within ±15° of vertical for example. In embodiments where the door 62 is mounted adjacent a rear cargo area 34, the axis of rotation X may be oriented generally vertically or generally horizontally.

Figure 2:
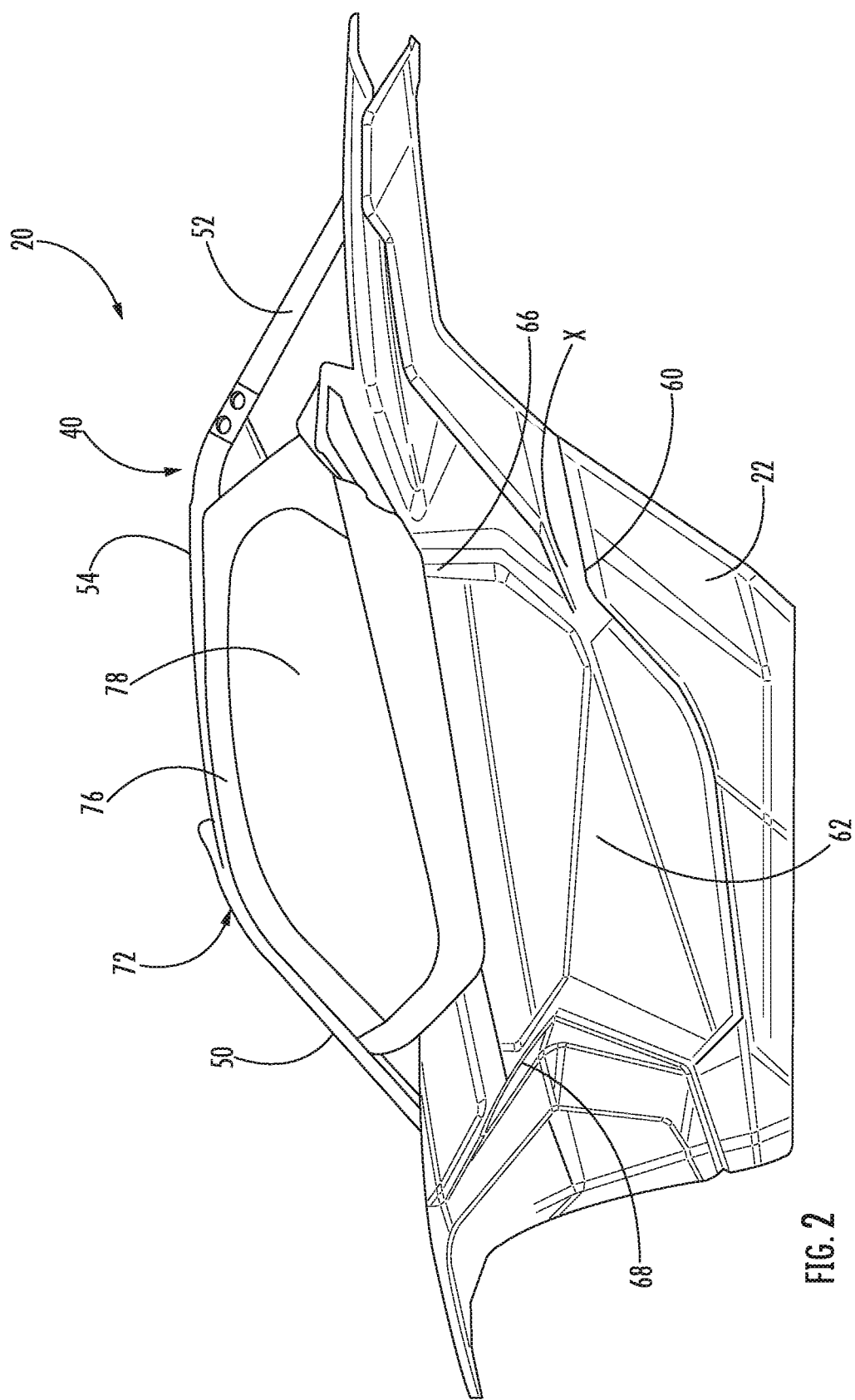
FIG. 2 is a side view of a utility vehicle including a door assembly according to an embodiment.
Figure 3:
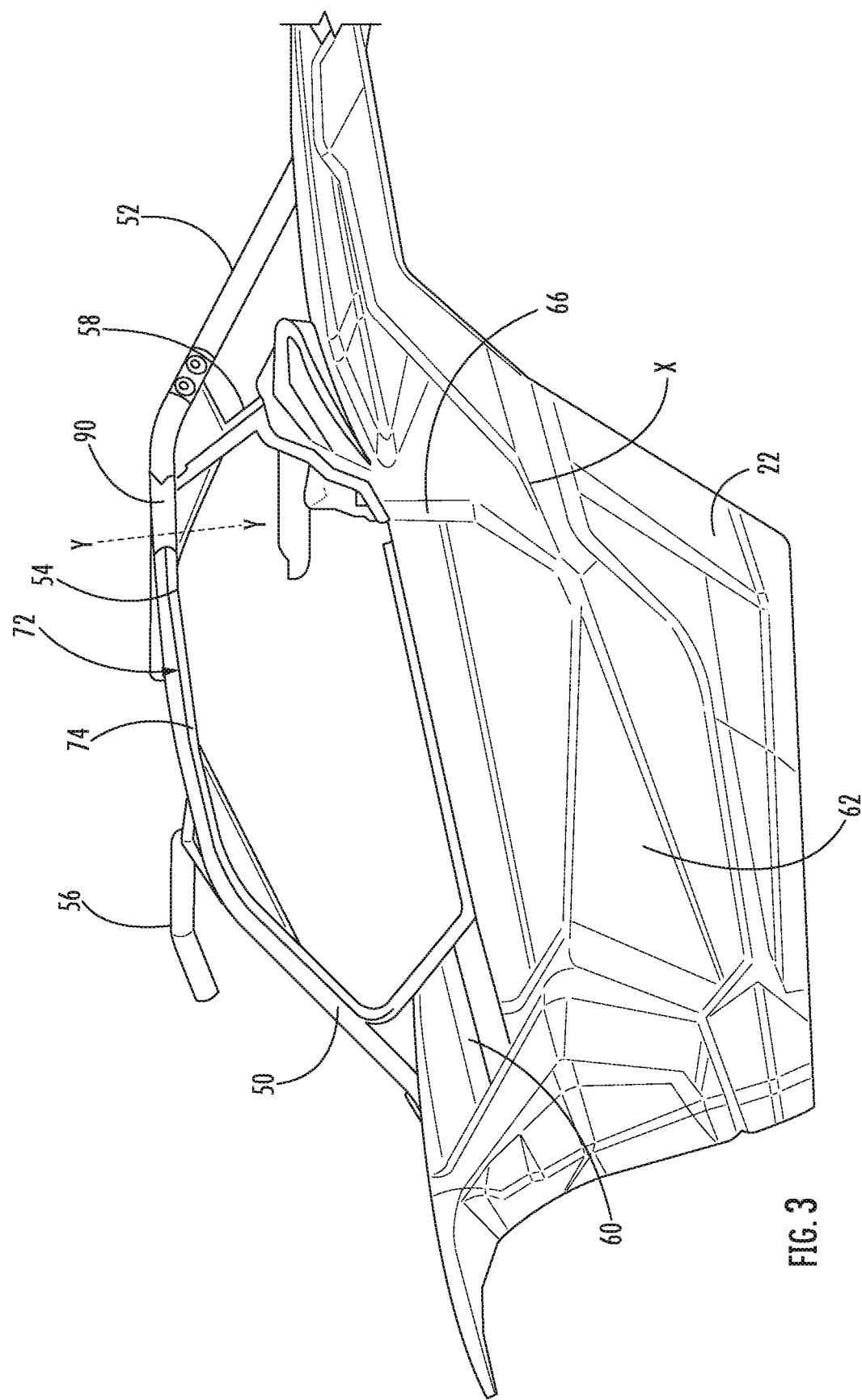
FIG. 3 is a side view of the utility vehicle of FIG. 2 with the covering of a portion of the door assembly removed according to an embodiment.
Figure 4:
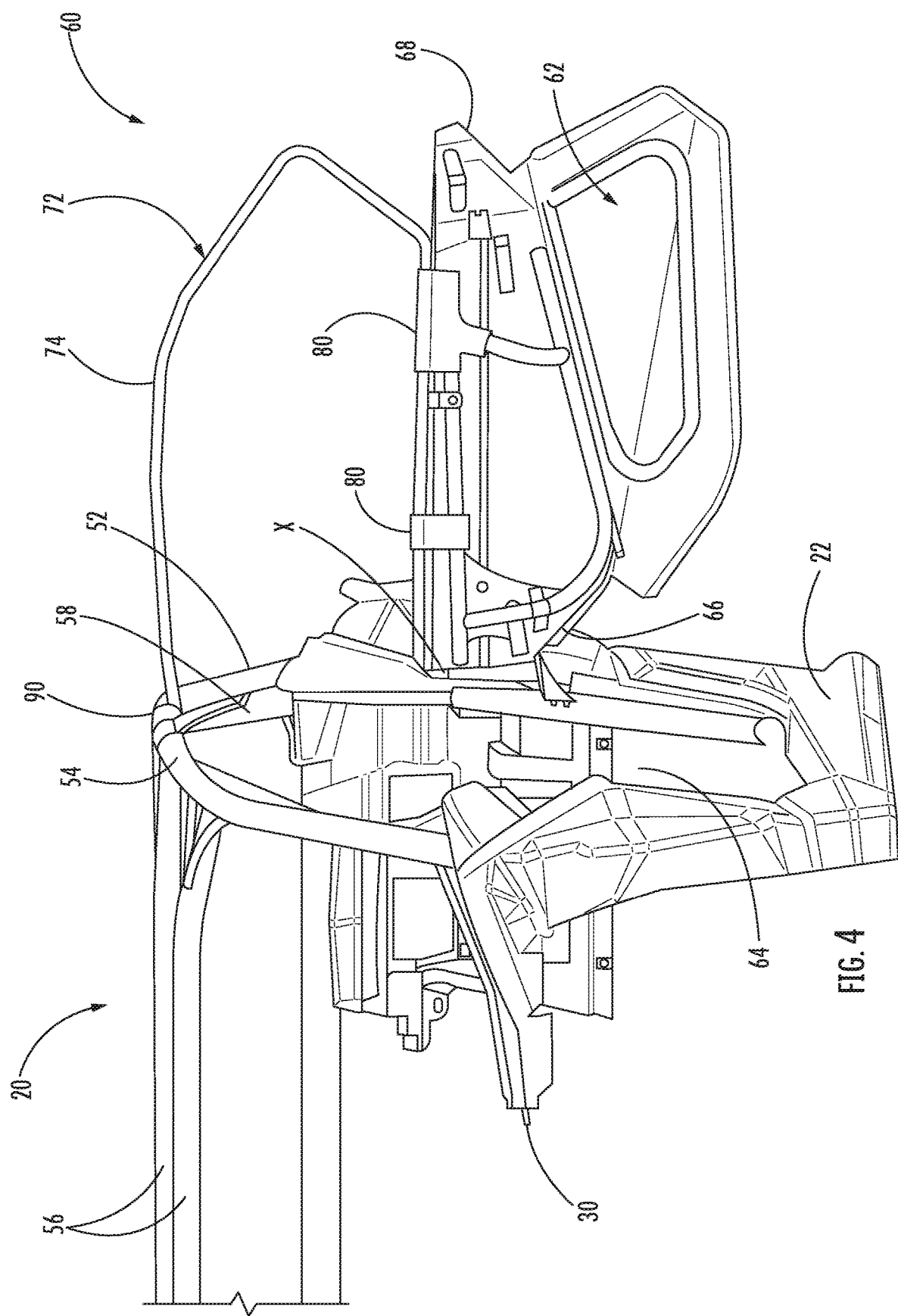
FIG. 4 is a perspective view of the utility vehicle of FIG. 3 with the door assembly in an open position according to an embodiment.
Figure 5:
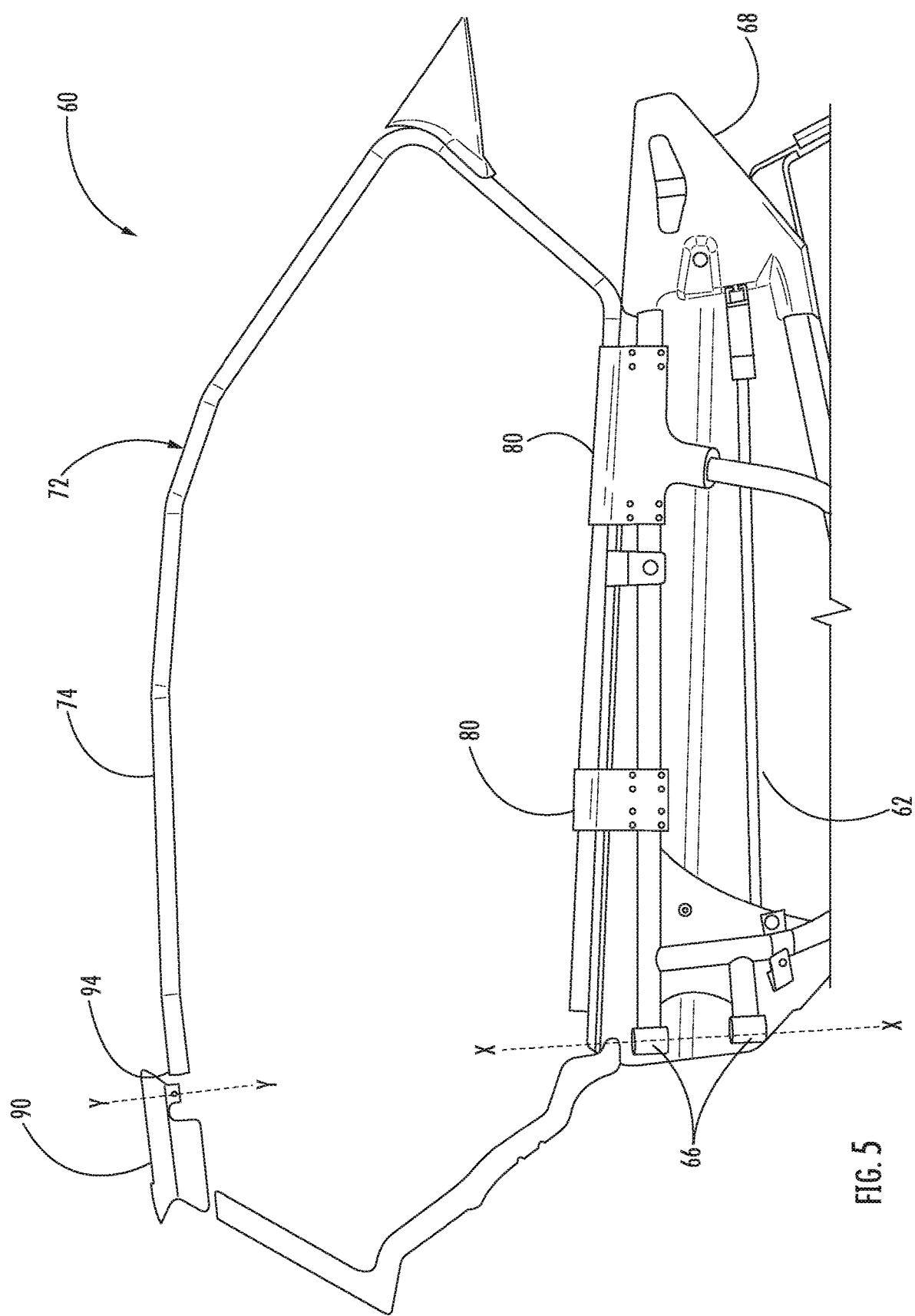
FIG. 5 is a front view of the interior of the door assembly of FIG. 2 according to an embodiment.

The door 62 is rotatable about the axis X between a closed position (see FIG. 2) and an open position (see FIG. 4). In the closed position, the door 62 is oriented generally parallel to the adjacent chassis 22 to seal a portion of the opening 64. In an open position, the door 62 is arranged at an angle to the chassis 22, such as between a 60 degree and 120 degree angle for example, to expose the adjacent opening 64 formed between the chassis 22 and the roll cage 40.

A latch (not shown), for example including a rotatable pawl and detent, is mounted at an edge 70 of the door 62 opposite the hinges 66 is provided to retain the door 62 in a closed position. A handle operably coupled to the latch may be used to selectively release the door 62, thereby allowing the door 62 to pivot freely about axis X from the closed position to an open position.

Figure 11:
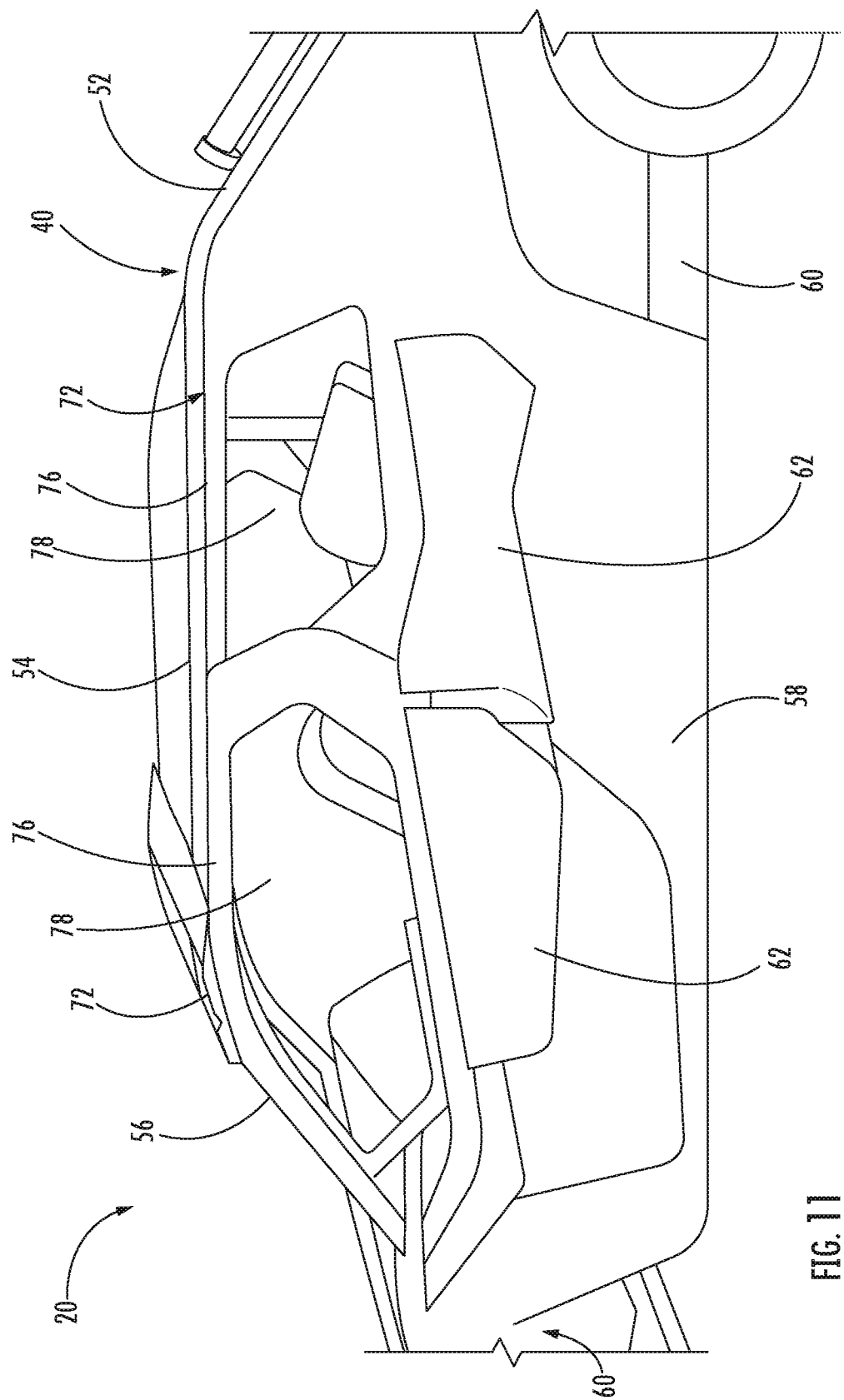
FIG. 11 is a side view of a utility vehicle including a plurality of door assemblies according to an embodiment.
Figure 12:
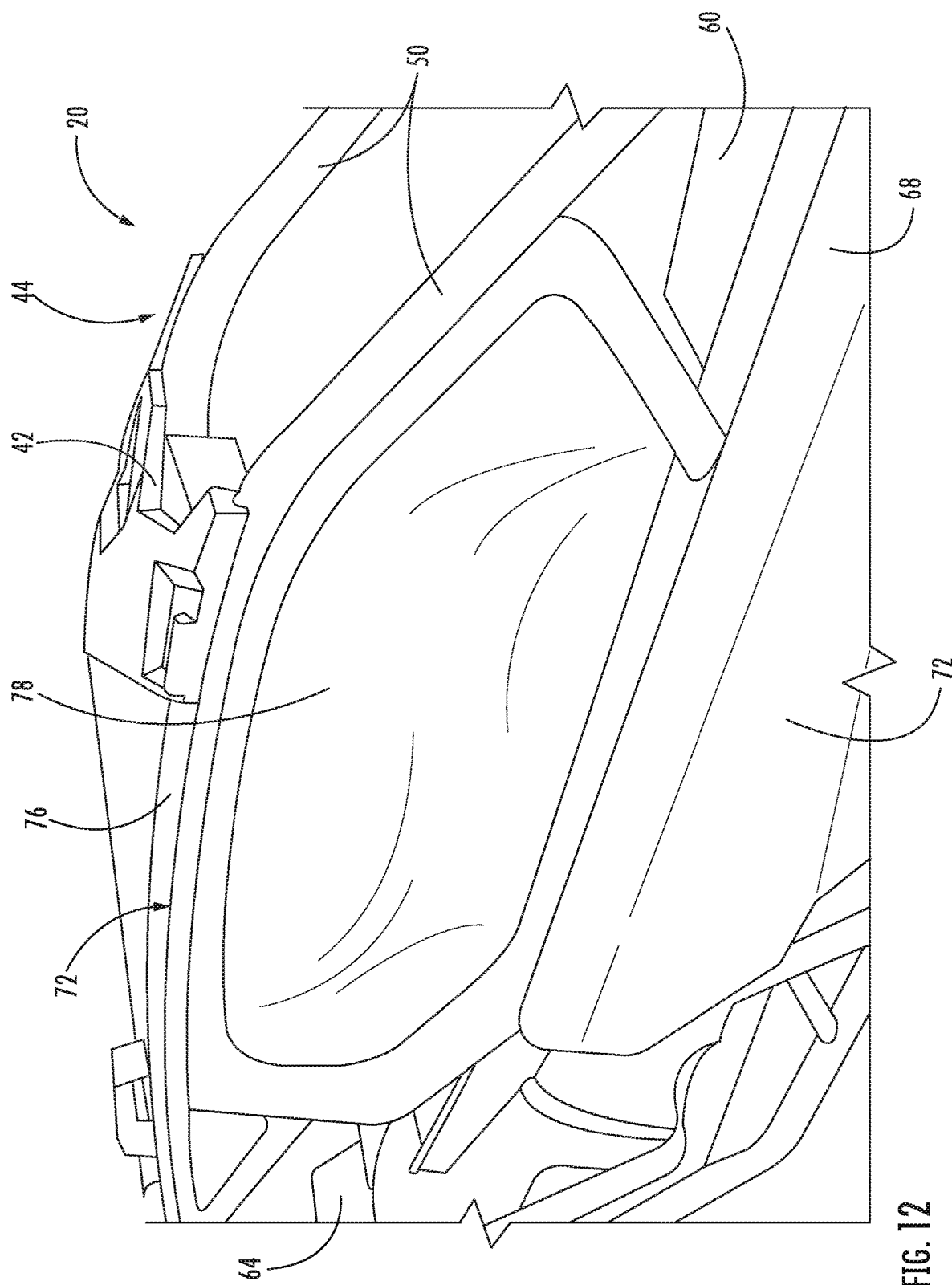
FIG. 12 is a perspective view of the utility vehicle of FIG. 11 according to an embodiment.
Figure 13:
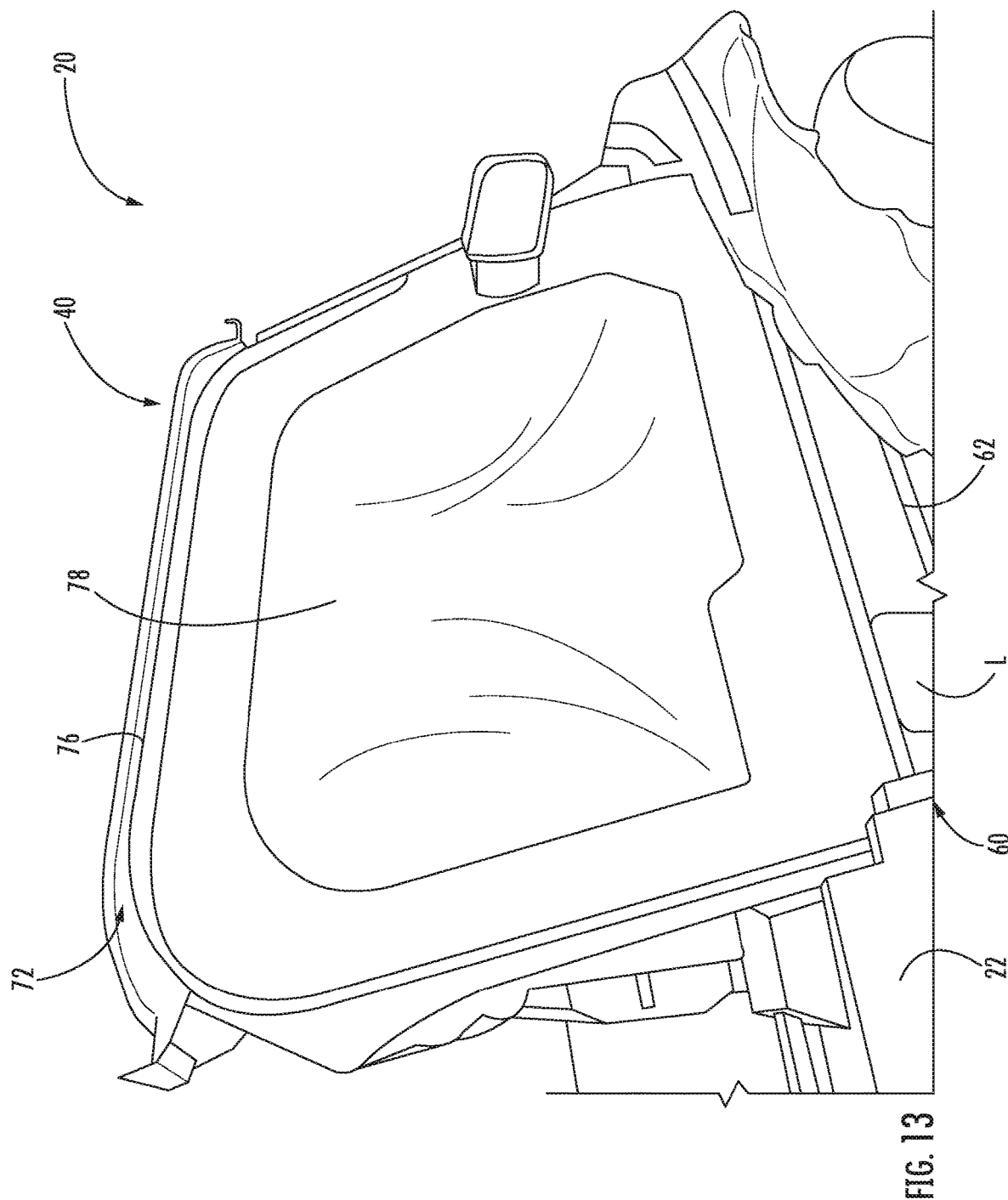
FIG. 13 is a perspective view of the utility vehicle according to an embodiment.
Figure 14:
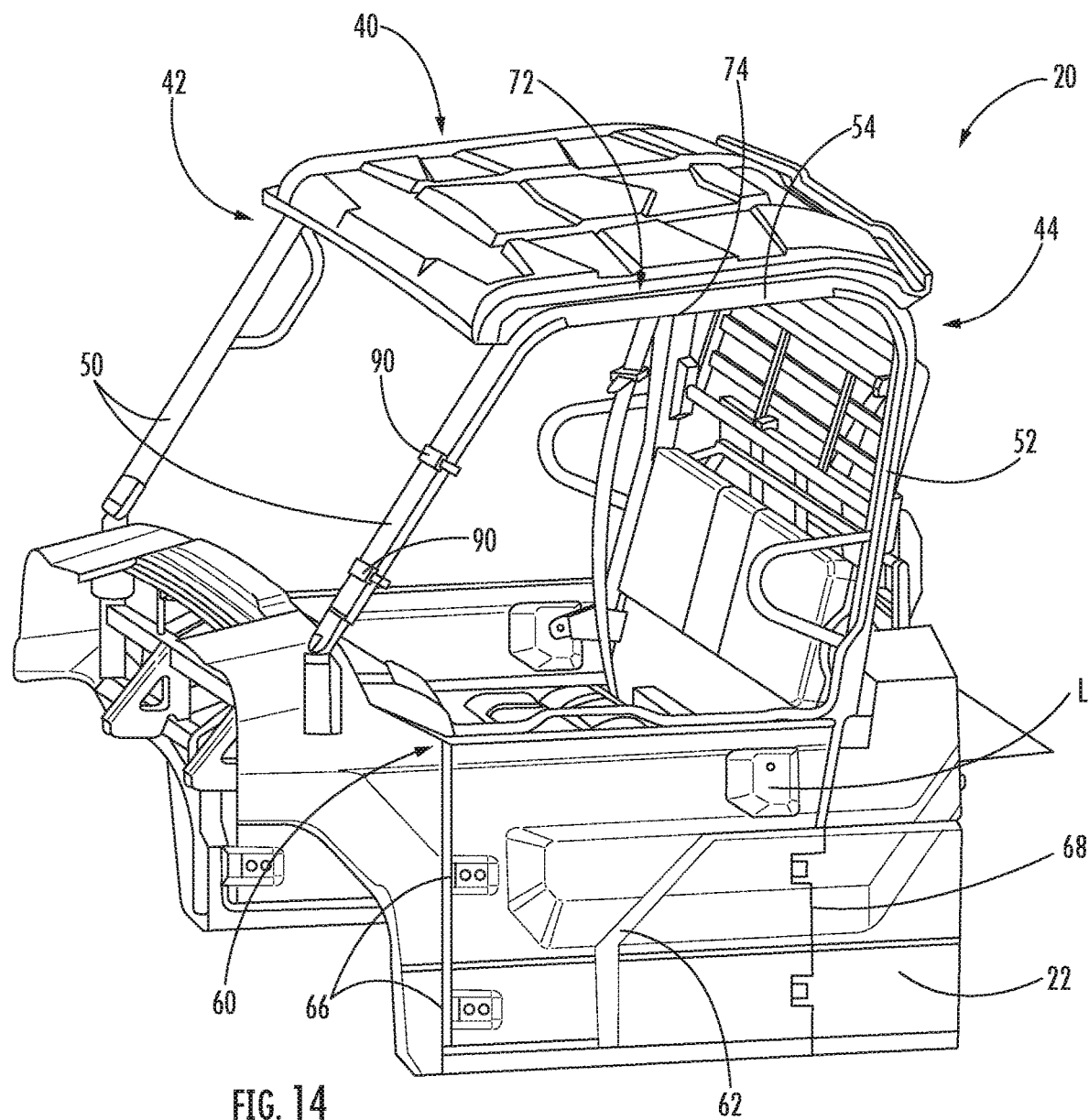
FIG. 14 is another perspective view of the utility vehicle of FIG. 13 with the covering of a portion of the door assembly removed according to an embodiment.
Figure 15:
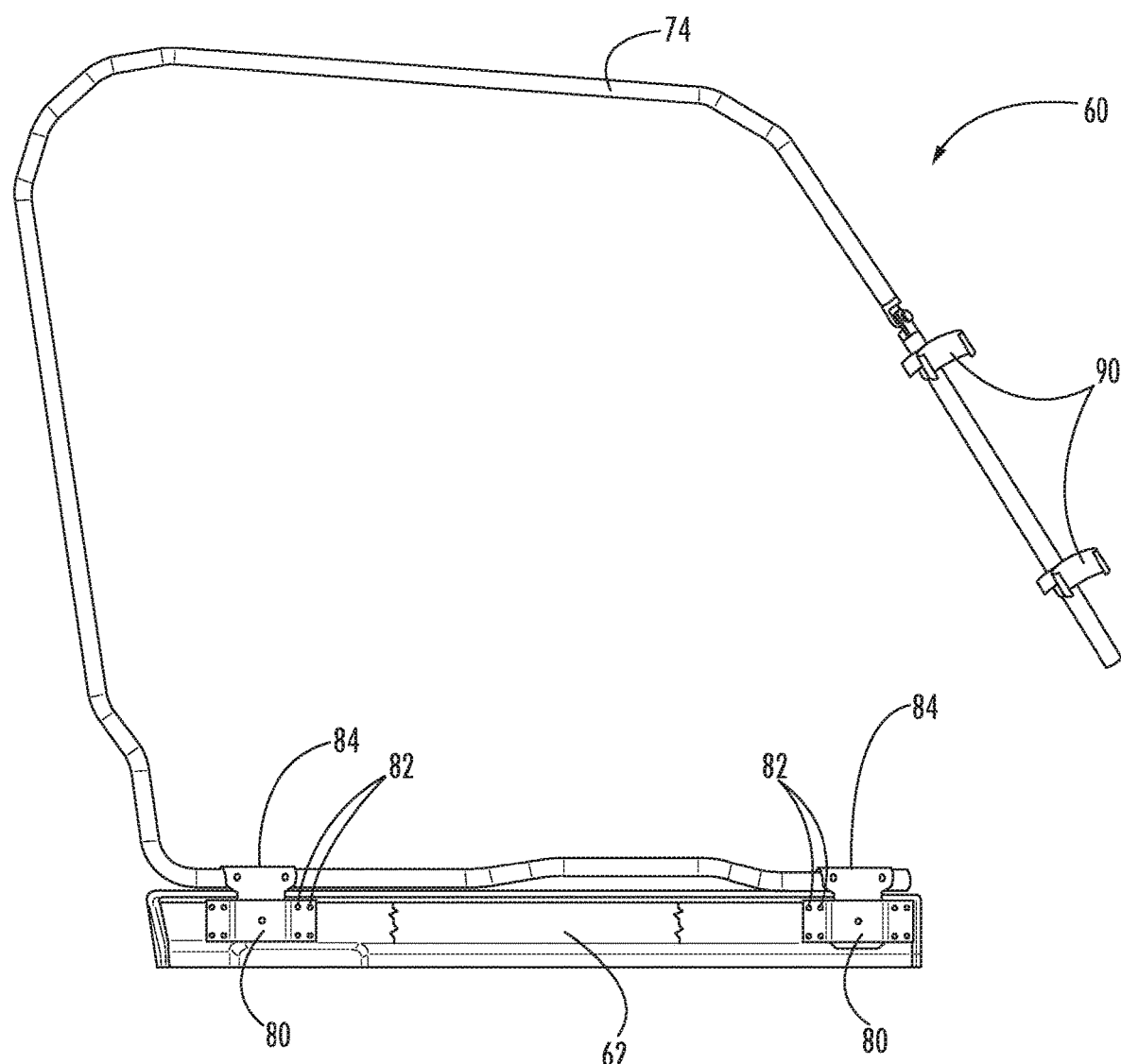
FIG. 15 is a front view of the door assembly of FIG. 14 according to an embodiment.
Figure 16:
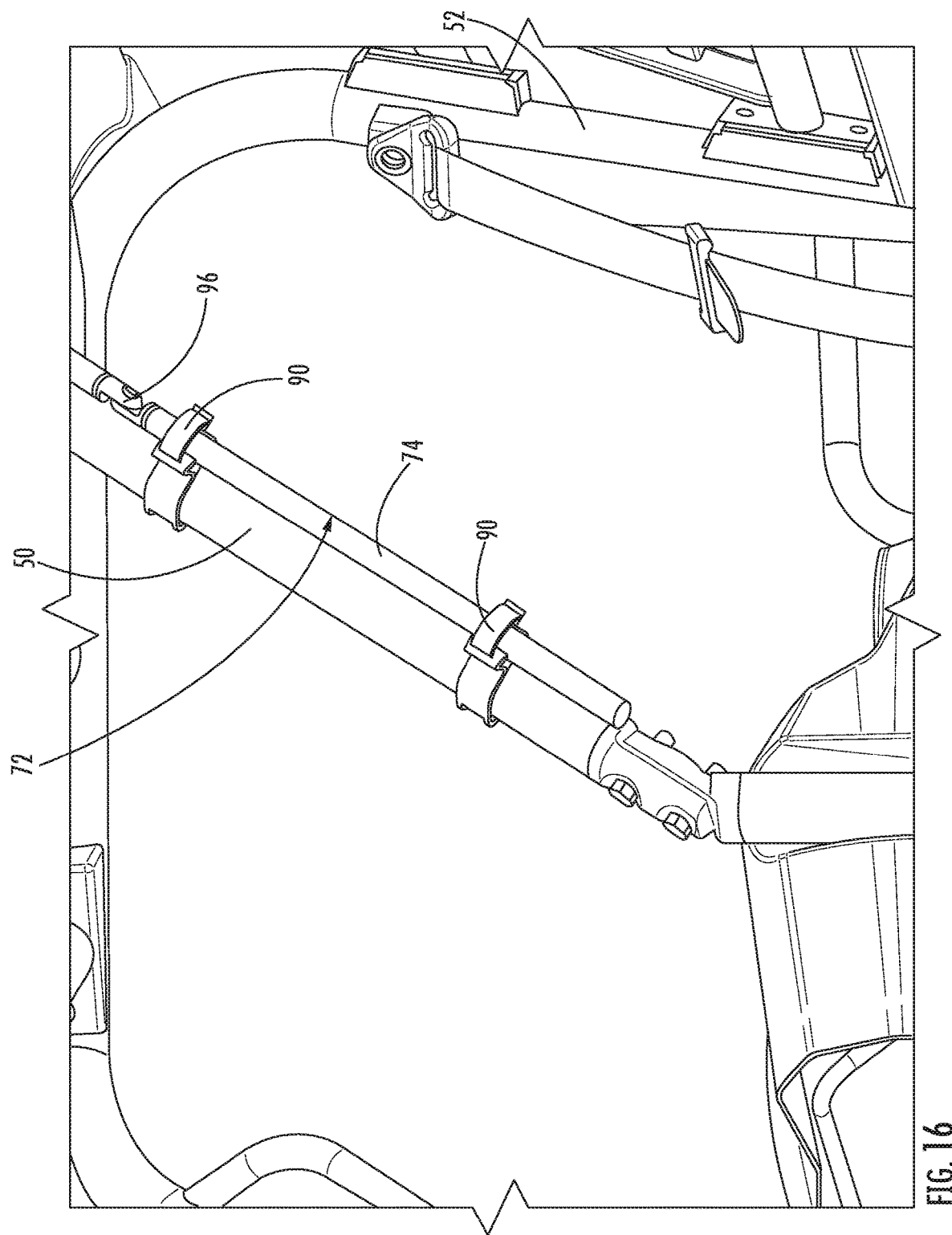
FIG. 16 is a perspective view of a portion of the door assembly of FIG. 14 according to an embodiment.
Figure 17:
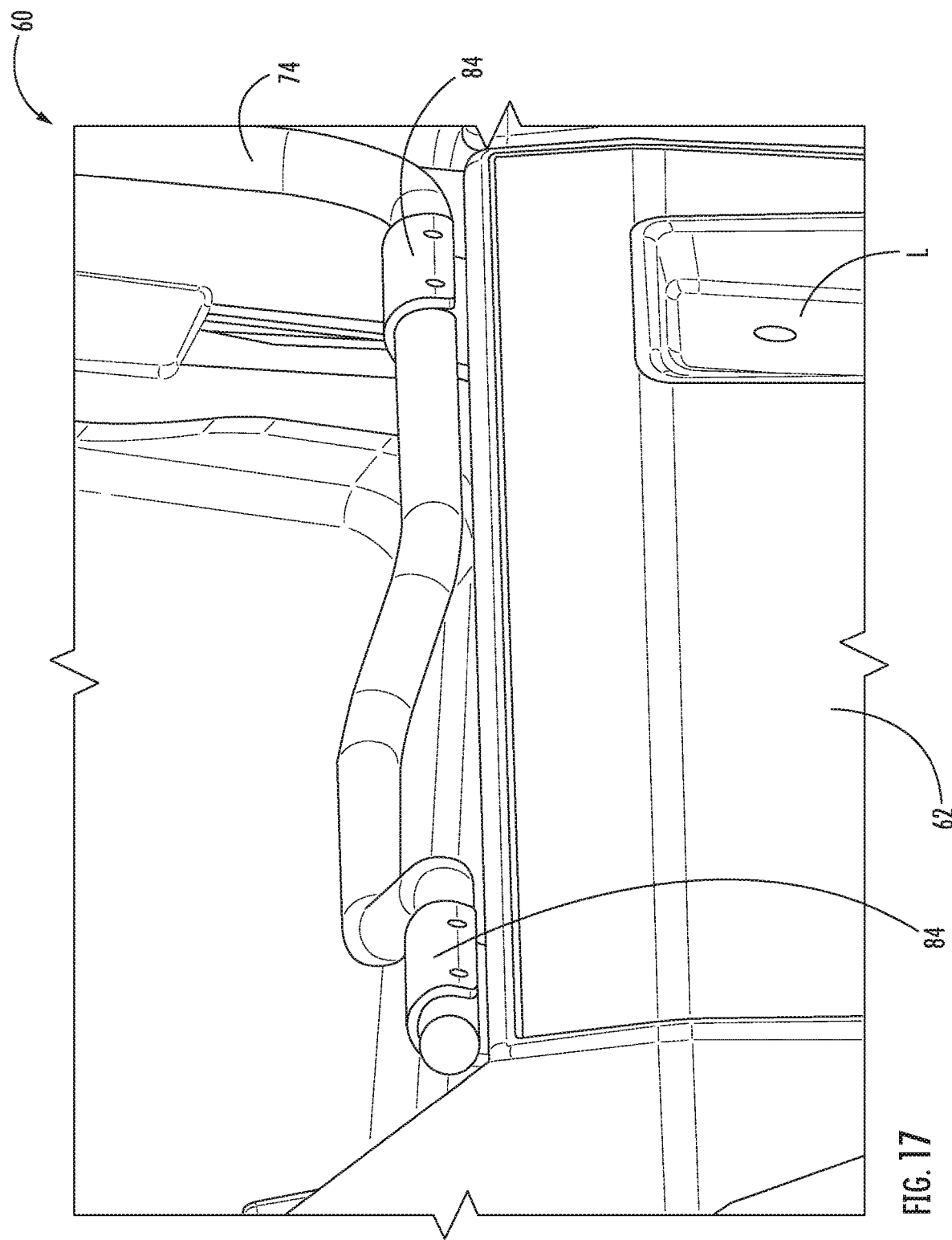
FIG. 17 is a perspective view of another portion of the door assembly of FIG. 14 according to an embodiment.
Figure 18:
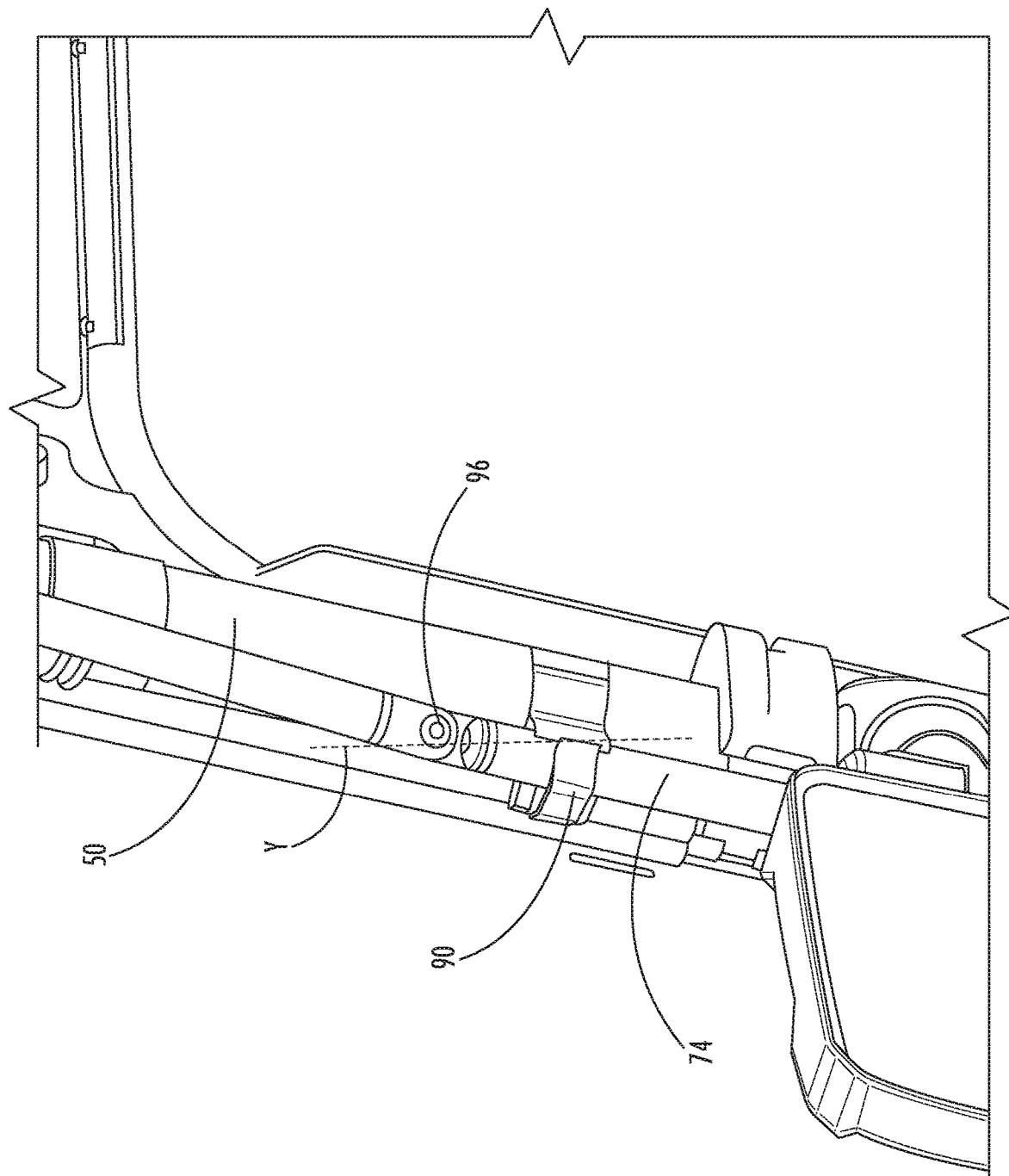
FIG. 18 is a perspective view of a portion of the door assembly of FIG. 14 according to an embodiment.
Figure 19:
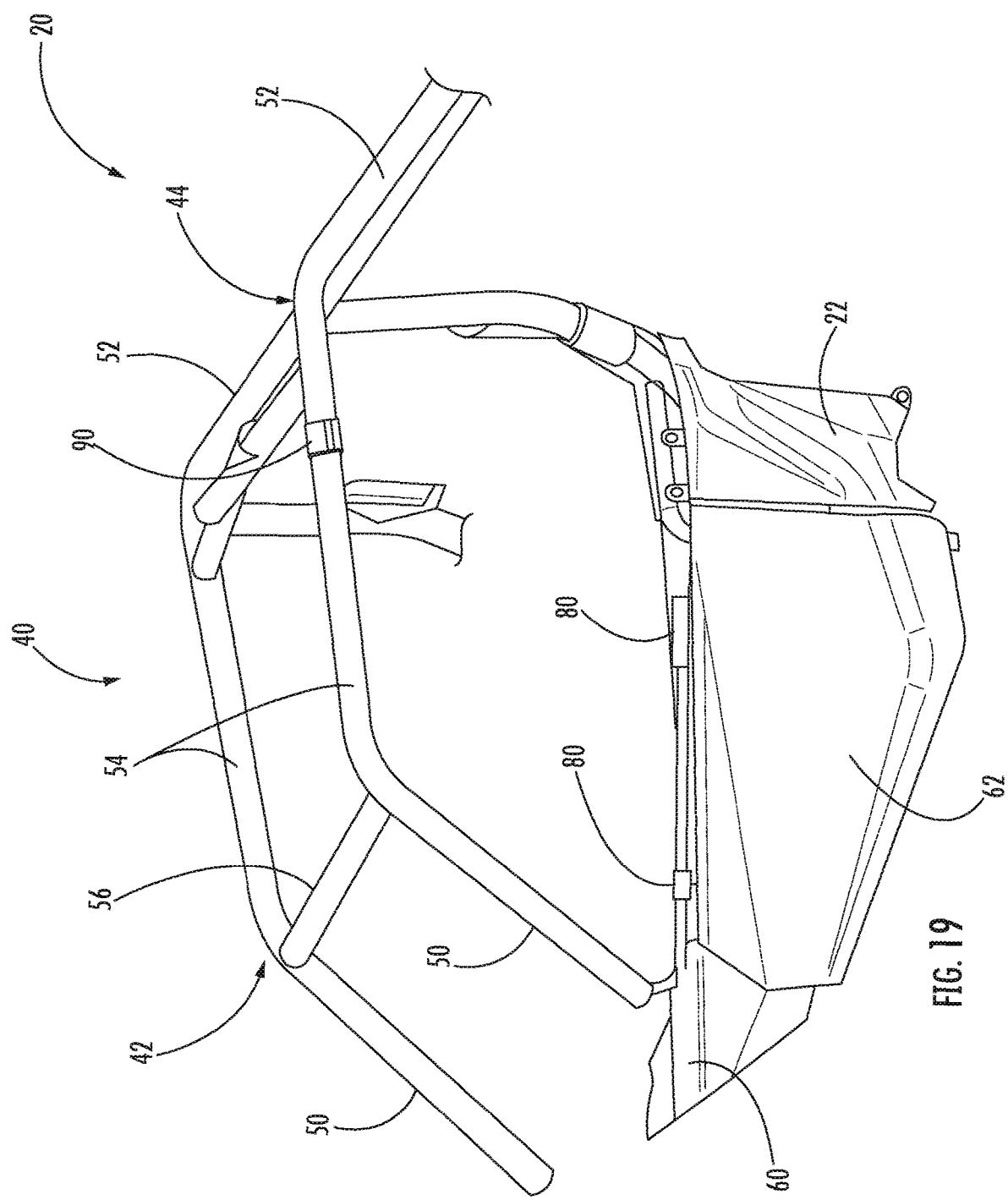
FIG. 19 is a perspective view of a utility vehicle including a door assembly according to an embodiment.
Figure 20:
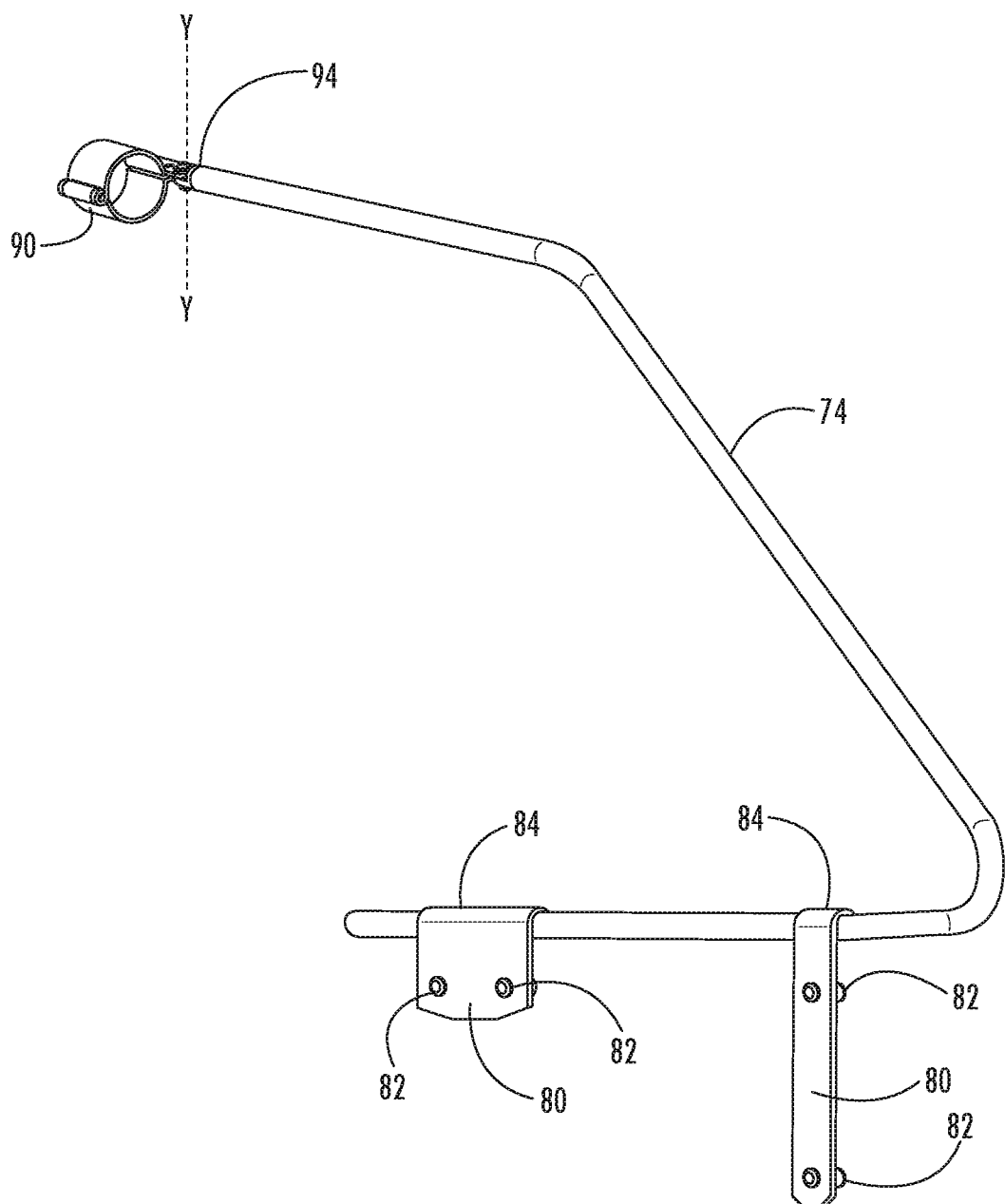
FIG. 20 is a perspective view of a portion of the door assembly of FIG. 19 according to an embodiment.
Figure 21:
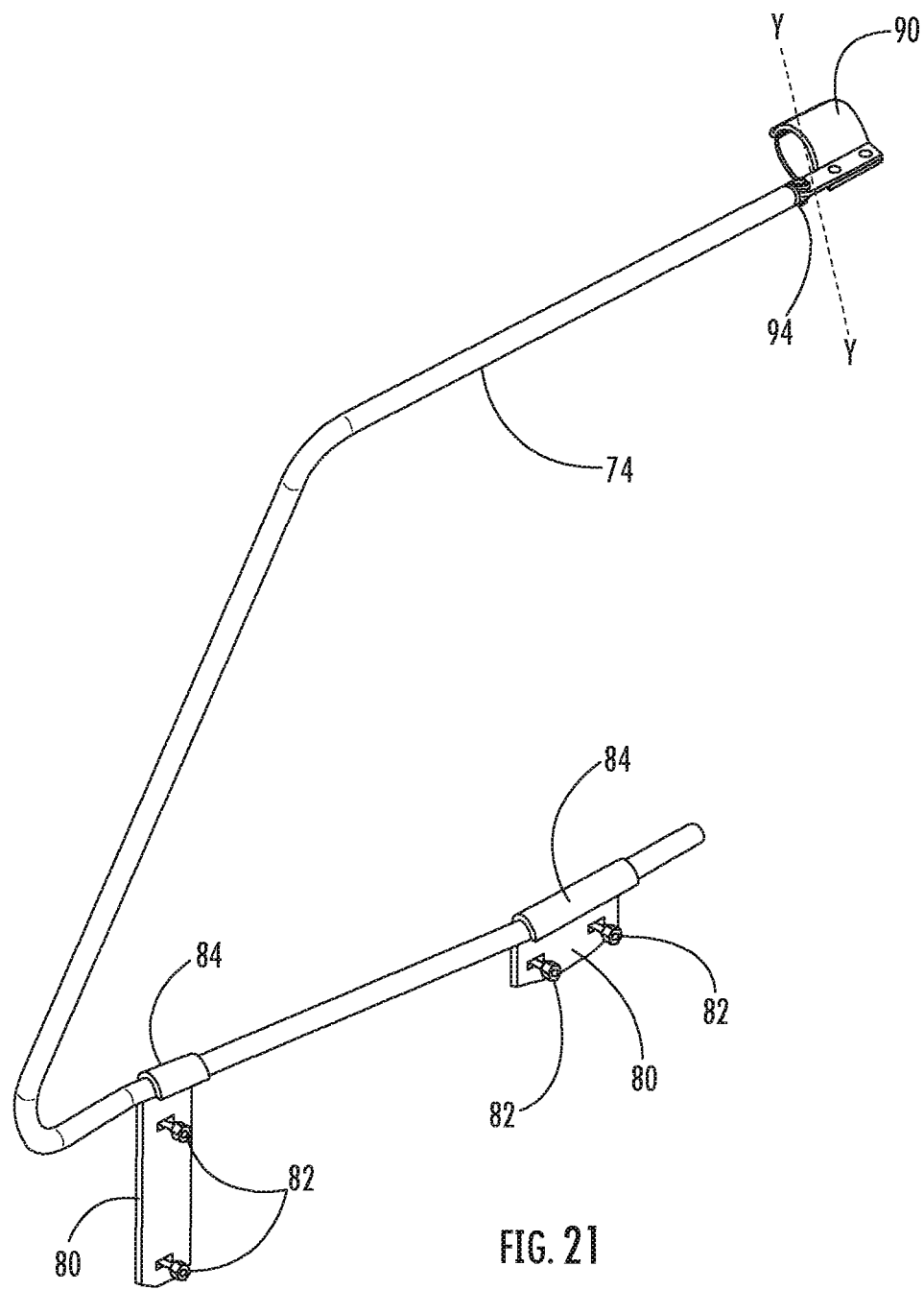
FIG. 21 is another perspective view of a portion of the door assembly of FIG. 20 according to an embodiment.

Because the height of the door 62 is generally complementary to the chassis 22, the door 62 is configured to seal only a lower portion of the opening 64 defined between the chassis 22 and the roll cage 40. With reference now to FIGS. 2-27, the door assembly 60 further includes a window assembly 72 disposed directly adjacent, for example vertically above, the door 62 to seal an upper portion of the opening 64. The window assembly 72 includes a frame 74 generally complementary to an adjacent portion of the roll cage 40. For example, in FIGS. 2-5, the frame 74 of the window assembly 72 has a contour similar to the front pillar 50, connecting pillar 54, and intermediate pillar 56 of a section 42, 44 of the roll cage 40. In another embodiment, illustrated in FIGS. 13-14, the frame 74 of the window assembly 72 is complementary to a contour defined by the front pillar 50, connecting pillar 54, and rear pillar 52 of a section 42, 44 of the roll cage 40. Alternatively, when the window assembly 72 is mounted adjacent a rear portion of the seating area 30, as shown in FIG. 11, the frame 74 is shaped similar to the intermediate post 56, connecting post 54, and the rear post 52.

A cover 76 is configured to surround the frame 74 to prevent rain and debris from entering the interior of the roll cage 40 when the window assembly 72 is in a closed position. The cover 74 may be formed from any suitable material, including, but not limited to fabric, plastic, glass, metal or any combination thereof. In an embodiment, at least a portion of the cover 76, such as a generally transparent window 78 formed therein for example, is configured to transform between a first extended configuration (see FIGS. 8 and 9) and a second retracted configuration (see FIG. 10) to provide access to the interior of the UTV 20. For example, the window 78 may be connected to the cover 76 via a fastener, such as a zipper for example. Accordingly, in the retracted configuration, the window 78 may be completely separate from the cover 76, or alternatively, only a limited portion of the window 78 may be connected to the cover 76, thereby allowing the window 78 to be rolled up or folded for storage (best shown in FIG. 10).

Similar to the first door 62, the window assembly 72 is rotatable about an axis between a closed position and an open position. In the closed configuration, the window assembly 72 is arranged substantially parallel to and flush with the chassis 22 and the roll cage 40, and in the open configuration the window assembly 72 is arranged at an angle to the chassis 22 such that the adjacent opening 64 is uncovered. In an embodiment, the window assembly 72 is arranged at an angle between about 60 degrees and 120 degrees in the open position.

In an embodiment, the window assembly 72 is connected to the first door 62 so that the first door 62 and the window assembly 72 of the door assembly 60 are transformable between the closed position and the open position, respectively, in unison. However, embodiments where the window assembly 72 and the first door 62 are independently operable are also contemplated herein.

As best shown in FIGS. 5, 7, 15, 17, 20 and 21 one or more mounting brackets 80 connect a portion of the frame 74 of the window assembly 72 to the first door 62. Each mounting bracket 80 is affixed to the first door 62, such as via one or more fasteners 82 for example. In an embodiment, the at least one mounting bracket 80 is configured to connect to a portion of the frame 74 arranged directly adjacent, i.e. upwardly adjacent, the first door 62. In the illustrated, non-limiting embodiment, an end 84 of each mounting bracket 80 extends beyond the door 62 and surrounds a substantial part or entirety of a periphery of the adjacent frame 74 (best shown in FIGS. 17 and 21). However, a mounting bracket 80 having any configuration, or any mechanism suitable to rigidly attach the frame 74 to the first door 62 is contemplated herein. In an embodiment, the door assembly 60 includes a plurality of mounting brackets 80 spaced apart from one another over the length of the first door 62. Inclusion of multiple mounting brackets 80 increases not only the strength of the connection between the frame 74 and the first door 62, but also the rigidity of frame 74. The rigidity of the door assembly 60 achieved via the mounting brackets 80 may be suitable for travel at or exceeding highways speeds.

Figure 6:
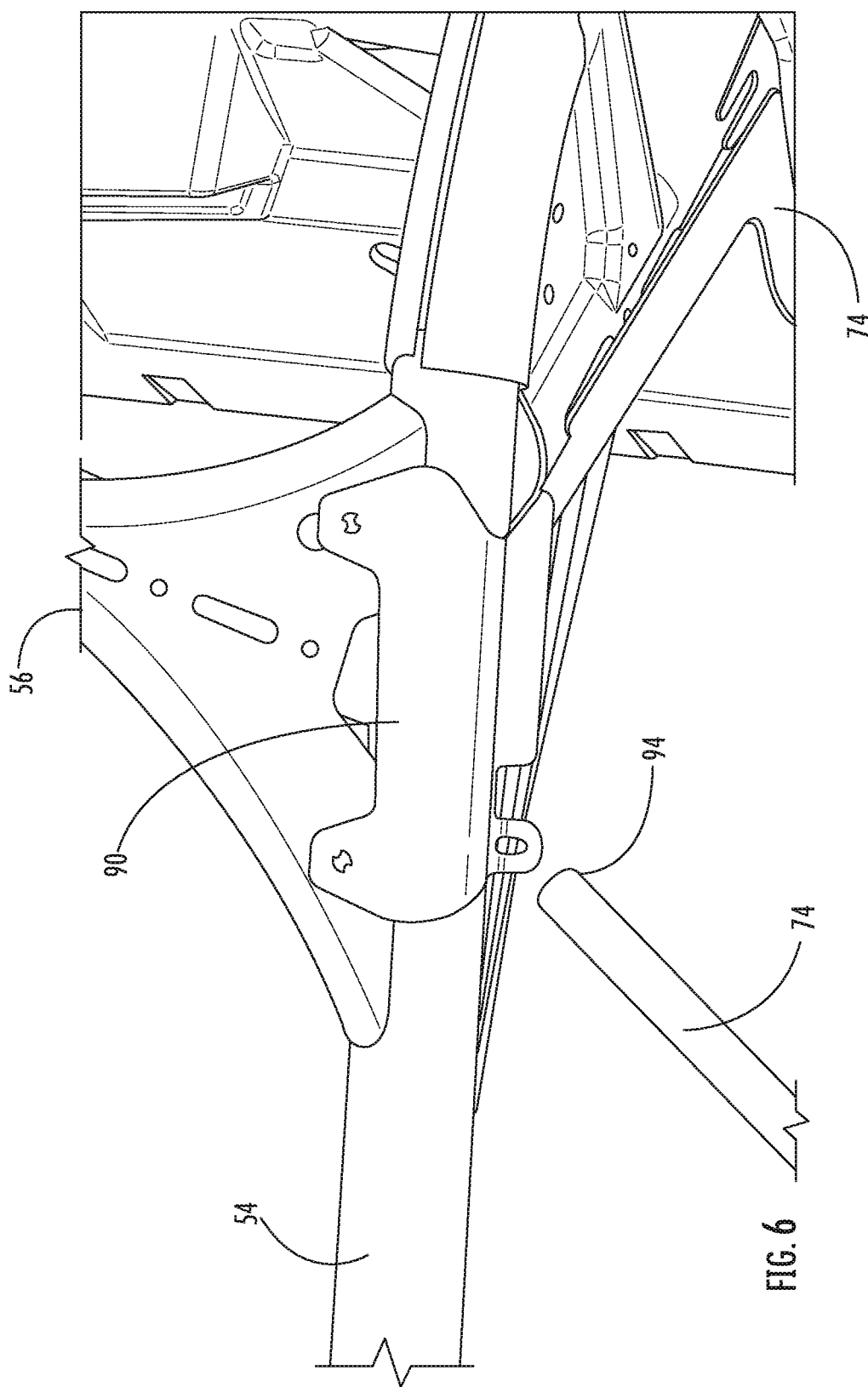
FIG. 6 is top perspective view of the utility vehicle of FIG. 3 according to an embodiment.
Figure 7:
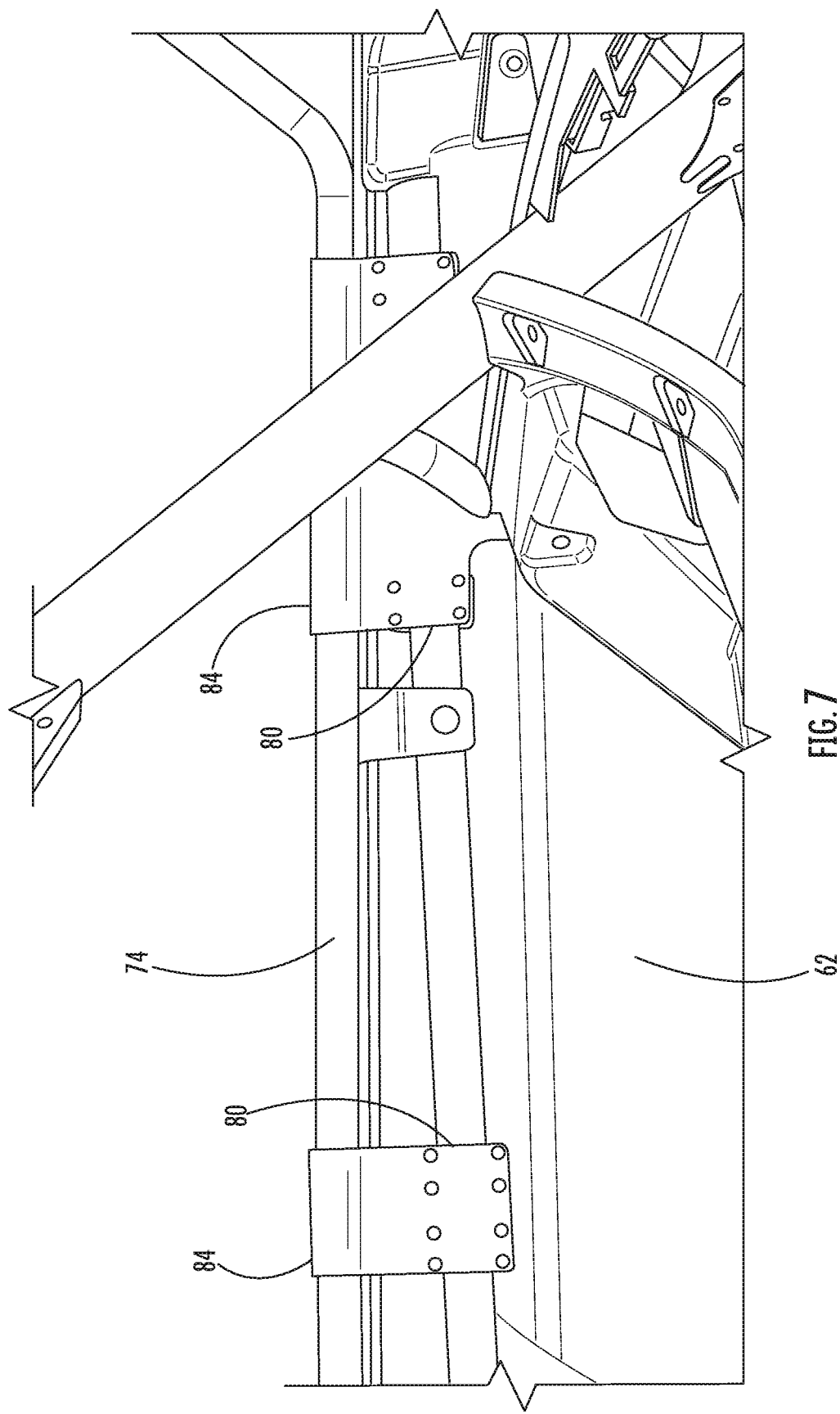
FIG. 7 is a perspective view of the interior of the door assembly of FIG. 3 according to an embodiment.
Figure 8:
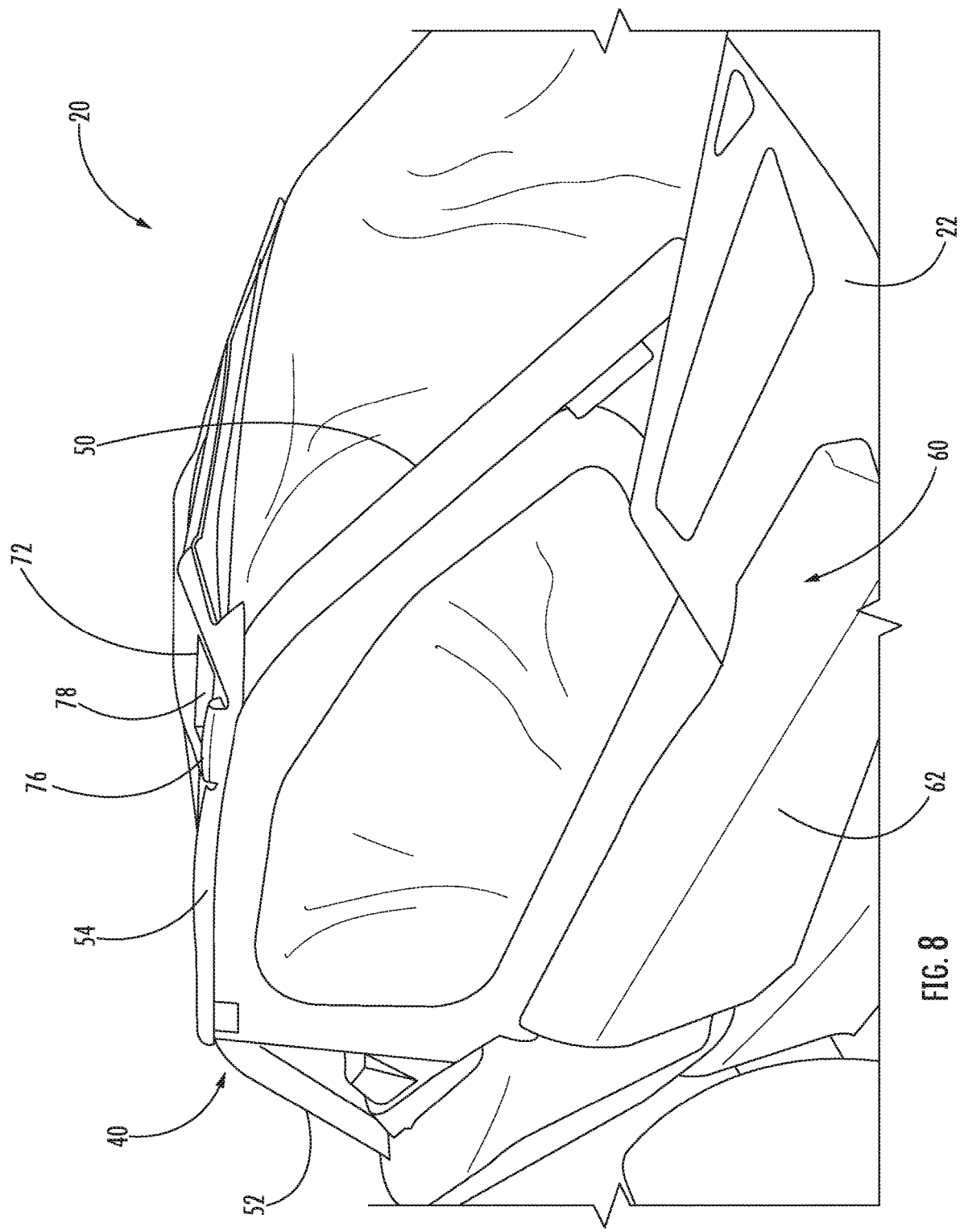
FIG. 8 is a perspective view of the door assembly of a utility vehicle in a closed configuration according to an embodiment.
Figure 9:
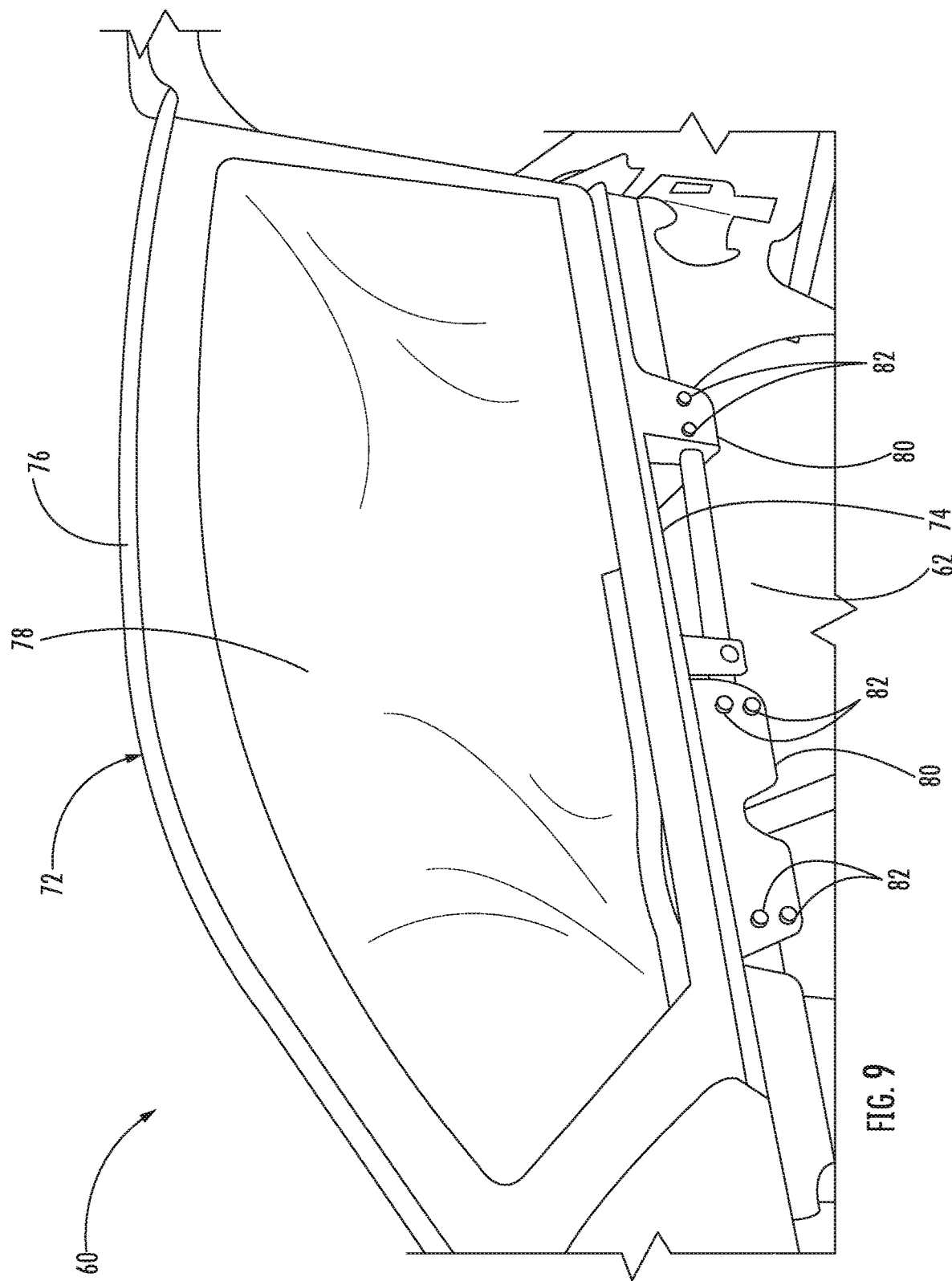
FIG. 9. is a perspective view of the door assembly of FIG. 8 in an open configuration according to an embodiment.
Figure 10:
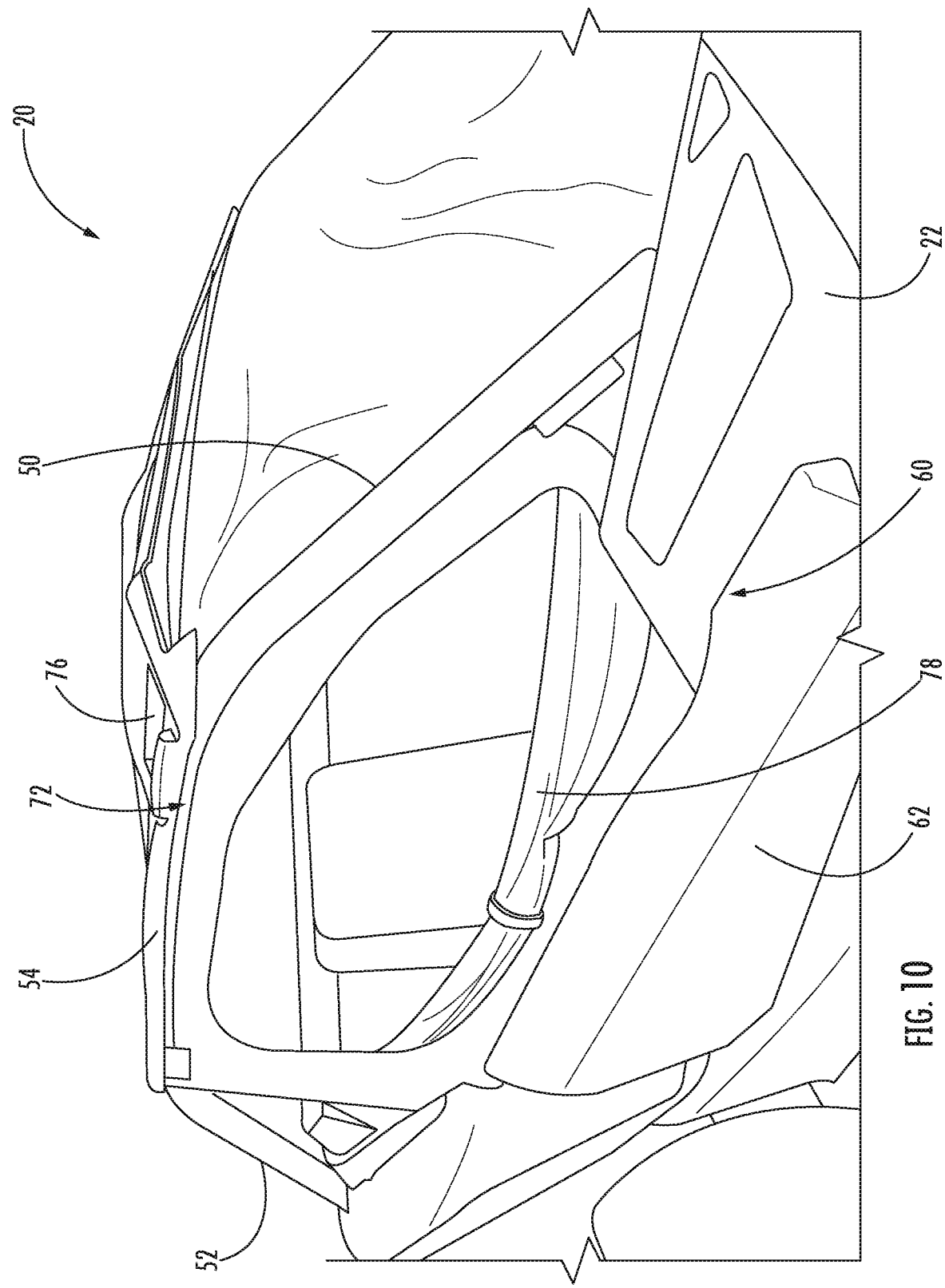
FIG. 10 is a perspective view of the door assembly of FIG. 8 with a portion of the covering of the window assembly in a retracted configuration according to an embodiment.

The window assembly 72 is additionally coupled to the roll cage 40 of the UTV 20 via one or more connectors 90. The position and type of connector 90 used to couple the frame 74 to the roll cage 40 will vary based on the configuration of UTV 20 and/or the lower door 62. The one or more connectors 90 are fixedly mounted to the roll cage 40, such as via one or more fasteners 92 for example, so that that no relative movement between the connector and the roll cage occurs 40. In an embodiment, the connector 90 has a plate-like configuration and is mounted parallel to an in overlapping arrangement with a portion of the roll cage 40, as shown in FIG. 6. In another embodiment, illustrated in FIGS. 19-23, the connector 90 is configured to surround or enclose a periphery of a portion of the roll cage 40, such as the connecting pillar 54 for example.

Figure 22:
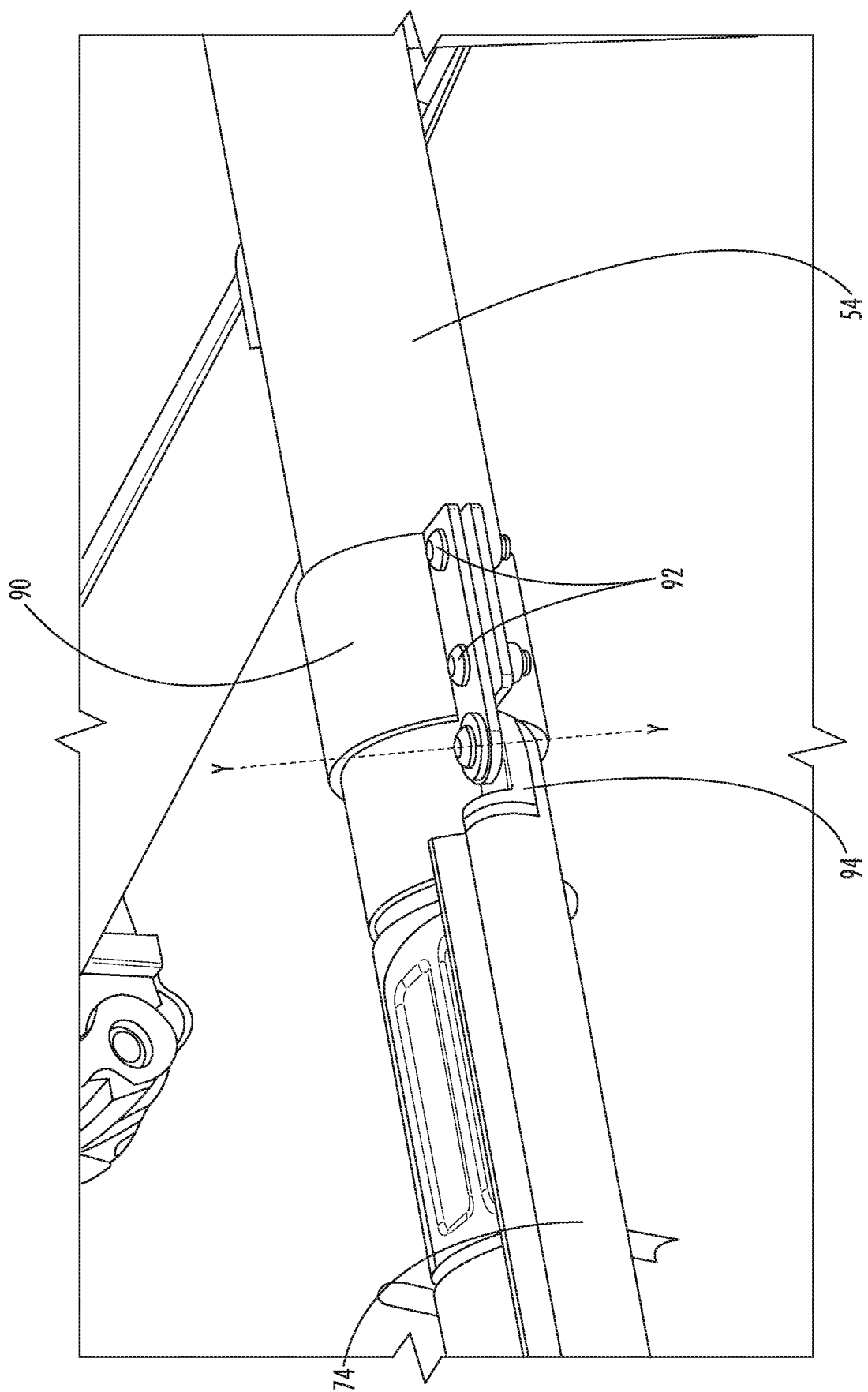
FIG. 22 is a perspective view of a portion of the door assembly of FIG. 19 according to an embodiment.
Figure 23:
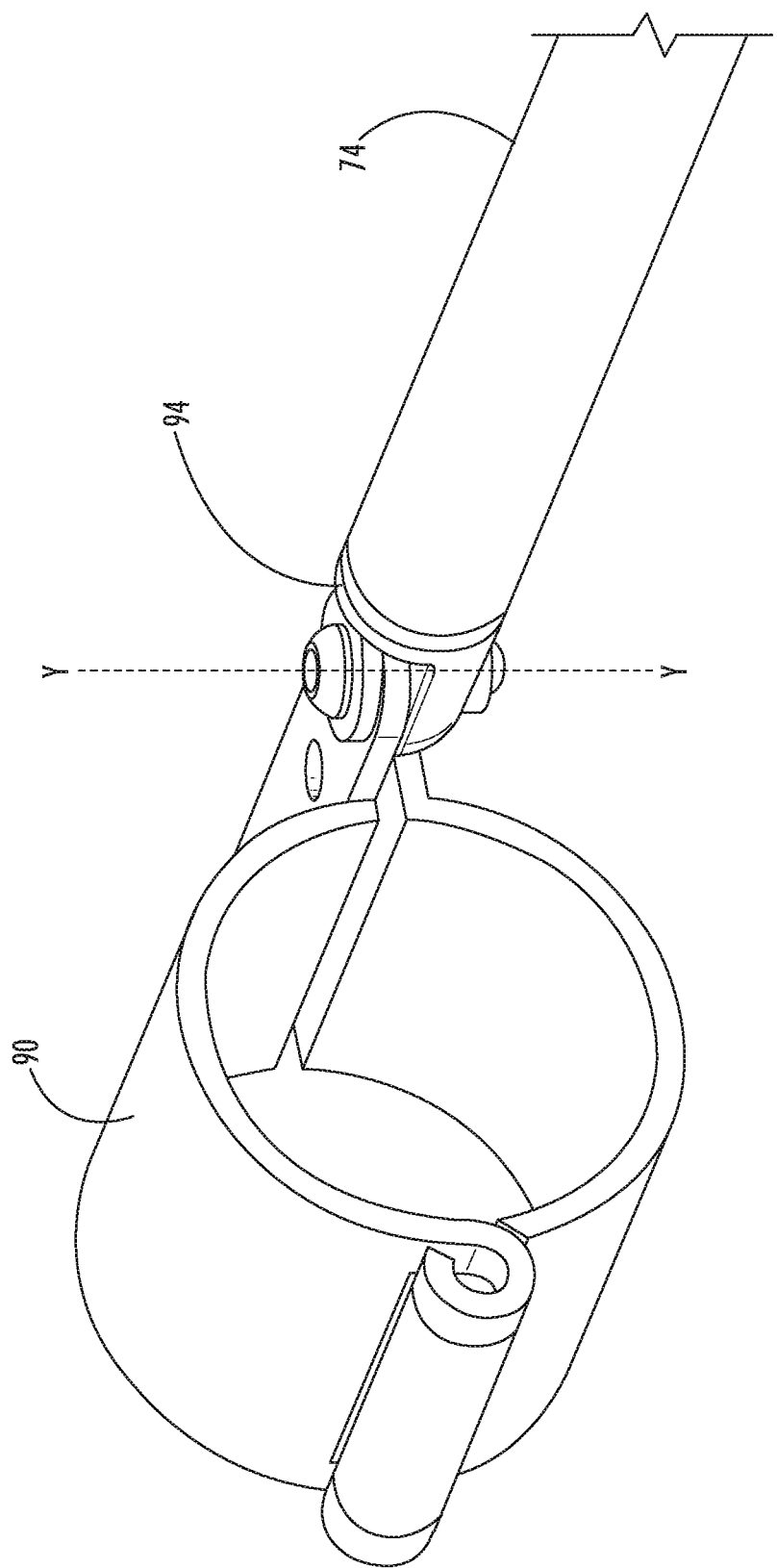
FIG. 23 is another perspective view of the portion of the door assembly of FIG. 22 according to an embodiment.

The frame 74 is associated with the connector 90 such that the frame 74 is configured to rotate freely relative to the connector 90 to define the rotational axis Y of the window assembly 72. In an embodiment, an end 94 of the frame 74 is pinned to the connector 90 to define the axis of rotation Y (FIGS. 22 and 23). In another embodiment, an intermediate portion of the frame 74 is receivable within a corresponding opening in the connector 90. In such embodiments, the frame 74 may be formed from two separate pieces operably coupled together via a hinge 96. The intermediate portion of the frame 74 is restricted from rotation and translation relative to the connector 90 and roll cage 40. It should be understood that the connectors illustrated and described herein are intended as examples only, and that any connector 90 suitable for use in the door assembly 60 is within the scope of the disclosure.

Upon actuation of a latch associated with the first door 62, both the door and window assembly 62, 72 are configured to rotate about their respective axes X, Y to allow a passenger to enter and exit from the vehicle 20. In an embodiment, to facilitate rotation of the door and window assembly 62, 72 as single unit, the rotational axis Y of the window assembly 72 and the rotational axis X of the door 62 are arranged generally parallel to one another, and in some embodiments, are generally collinear. However, in other embodiments, the rotational axes X, Y are offset from one another. Further, misalignment of rotational axes X and Y can be tolerated due to the flexure of the frame 74 of the window assembly 72. This flexure allows the position of the connector 90 or hinge 96 of the window assembly 72 to be optimized to allow the window assembly 72 to smoothly rotate in conjunction with the door 62 to access to the opening 64. In such embodiments, the rotational axes X, Y are arranged at an angle of than or equal to about 30 degrees, and more specifically at an angle of less than or equal to 15 degrees.

Figure 24:
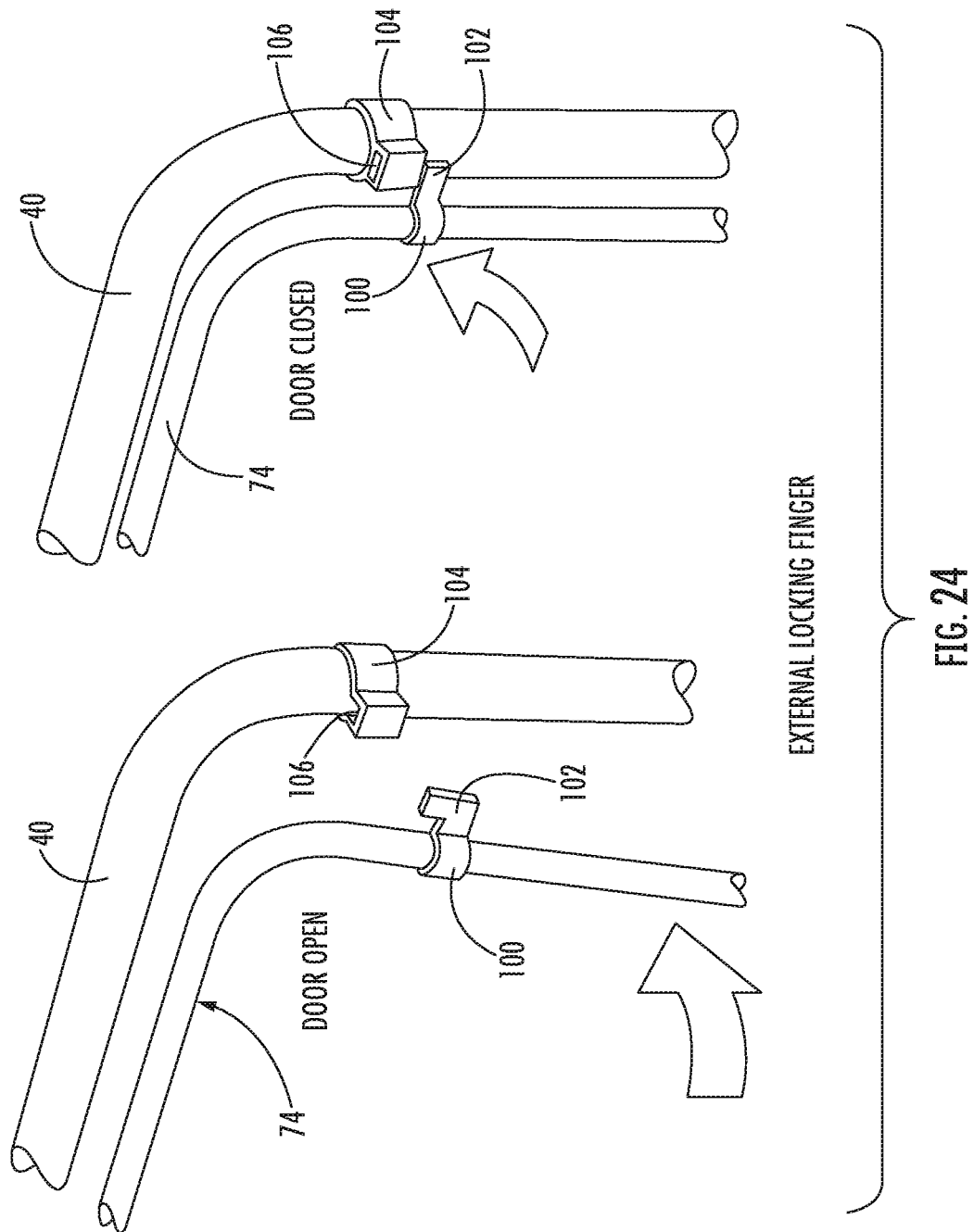
FIG. 24 is a perspective view of a portion of a window assembly in an open and closed position according to an embodiment.
Figure 25:
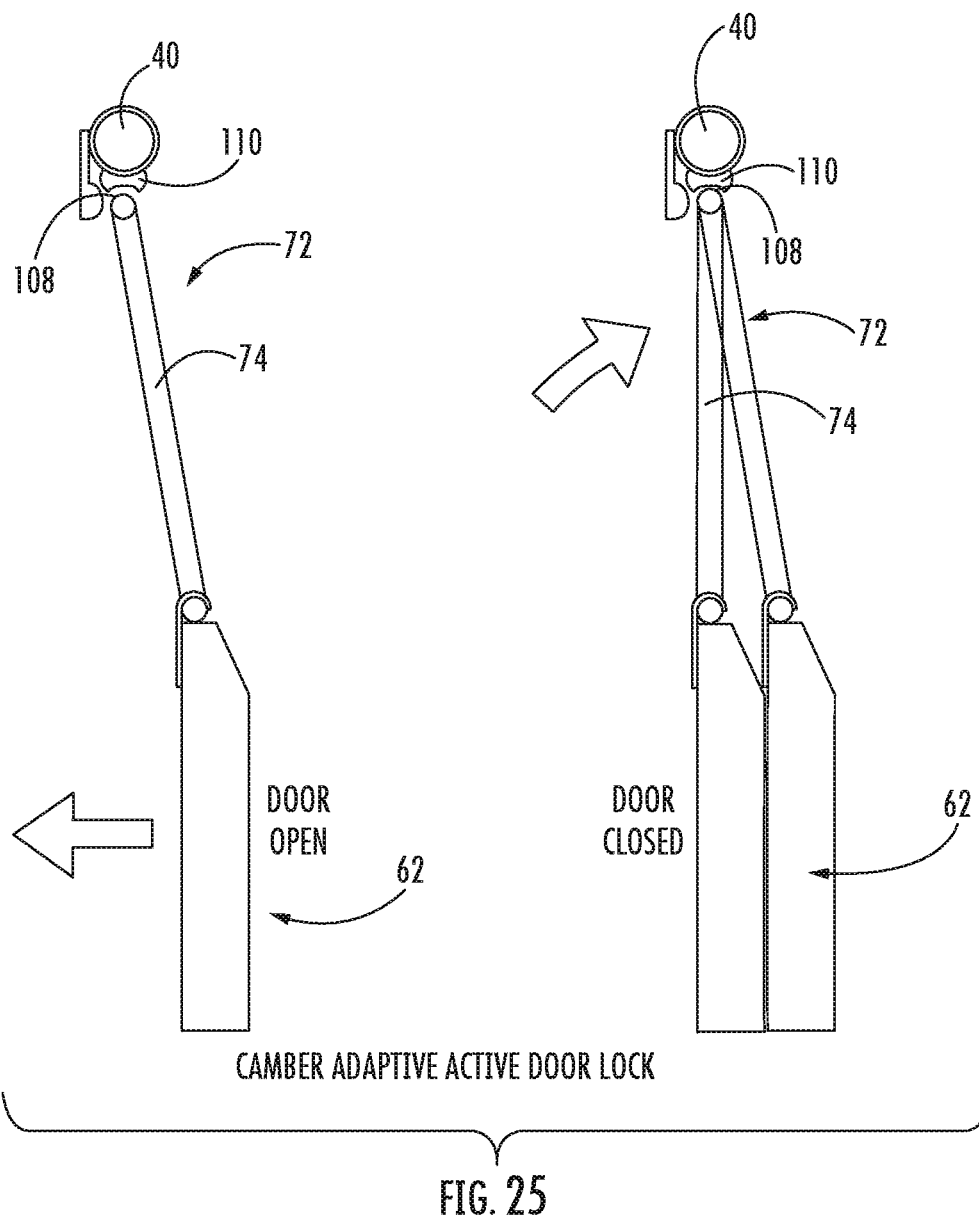
FIG. 25 is a side view of a door and window assembly in an open and closed position according to an embodiment.
Figure 26:
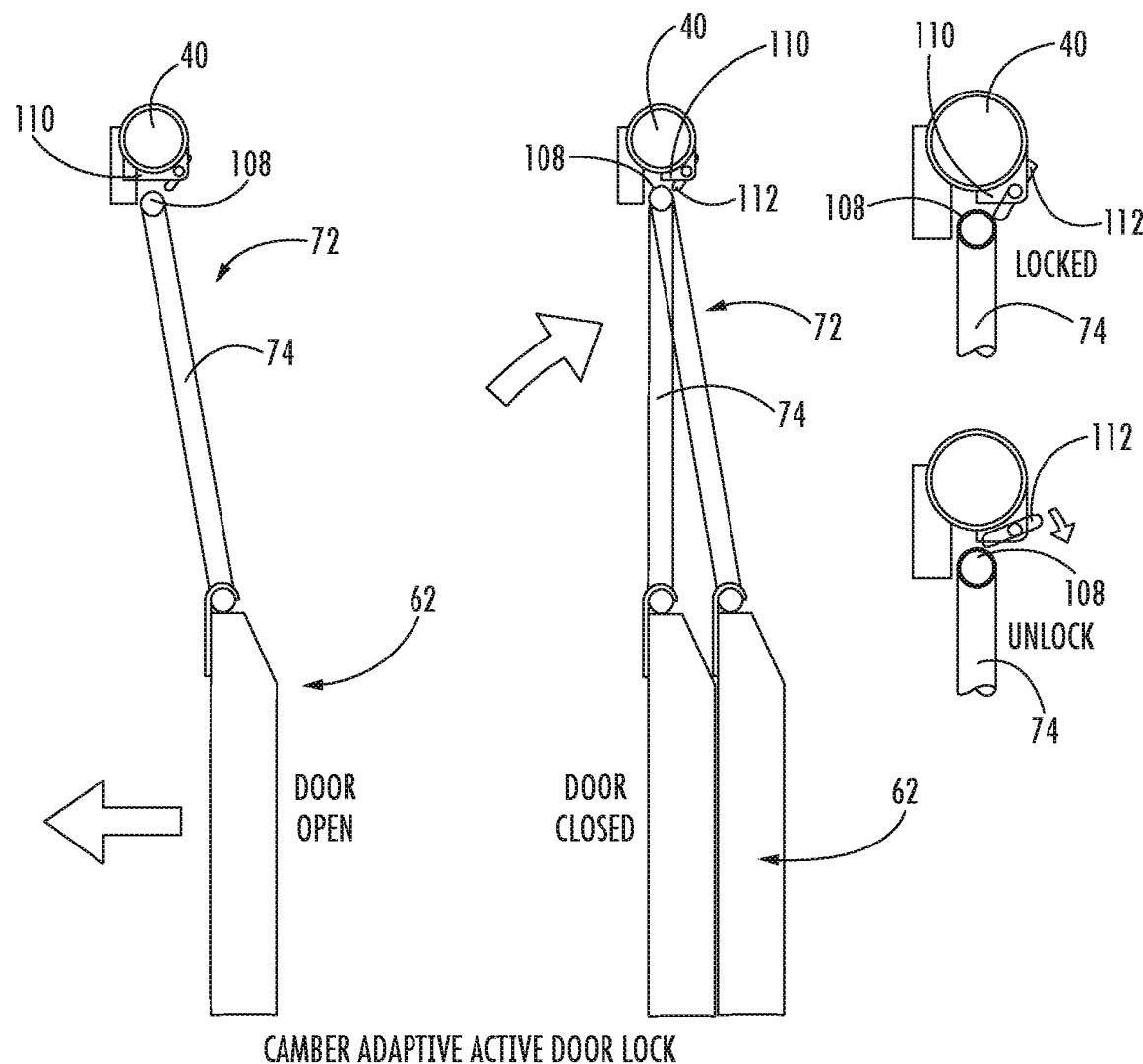
FIG. 26 is a side view of a door and window assembly in an open and closed position according to another embodiment.

With reference now to FIGS. 24-26, in an embodiment, the frame 74 of the window assembly 72 is configured to flex to assist in locking the frame 74, and therefore the window assembly 72, in a closed position. In the non-limiting embodiment of FIG. 24, a clamp 100 having an engagement member 102 extending therefrom is mounted to a portion of the frame 74. A clamp 104 having an opening 106 complementary to the engagement member 102 is mounted to a corresponding portion of the roll cage 40. As the door 62 and window assembly 72 are pivoted about their respective axes X, Y towards the closed position, at least a portion of the frame 74 begins to flex about a secondary axis, distinct from rotational axis Y. This flexure causes the engagement member 102 to insert and translate relative to opening 106 formed in the clamp 104 on the roll cage 40. In an embodiment, this flexure may be directly caused by engagement between a forward portion of the frame 74 and a corresponding portion of the roll cage 40.

Alternatively, the flexure of the frame 74 may be configured to allow the window assembly 72 to move into engagement with the roll cage 40. As shown in FIGS. 25 and 26, an upper portion 108 of the frame 74 is separate from a corresponding connector 110 on the roll cage 40 when the door 62 and window assembly 72 are in the open position. As the door and window assembly 62, 72 are rotated closed, the window frame 74 engages the connector 110 and temporarily bends while closed to achieve a vertical orientation as shown on the right.

The connector of the roll cage may additionally include an active locking mechanism 112 movable between an unlocked and a locked position. When the locking mechanism is in a locked position, movement of the door and window assembly 62, 72 from the closed position is restricted as shown in FIG. 26. In the non-limiting embodiment, the locking mechanism comprises a rotatable bar, and the angle of the bar relative to the frame 74 restricts motion of the frame 74 away from the roll cage 40. However, the frame 74 may be receivable adjacent the roll cage 40, corresponding to a closed position of the window assembly 72, regardless of whether the locking mechanism 112 is arranged in an unlocked or locked position. The locking mechanism 112 illustrated and described herein is intended as an example only, and other suitable locking mechanisms are also contemplated herein.

A UTV 20 including a door assembly 60 having both a door 62 and a window assembly described herein provides a barrier for protecting an operator of the UTV 20 from debris, rain, etc. . . .

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A utility task vehicle, comprising:
   a vehicle body including an opening defined by a roll cage;
   a door positioned adjacent said opening, said door being configured to pivot about a first axis between an open position and a closed position; and
   a window assembly positioned adjacent and operably coupled to said door, said window assembly including a frame mounted to said roll cage and said door, said frame being configured to pivot about a second axis between an open position and a closed position, wherein rotation of said window assembly about said second axis is driven by rotation of said door about said first axis, wherein in combination, said door and said window assembly substantially seal said opening of the vehicle body.

2. The utility task vehicle according to claim 1, wherein said first axis and said second axis are generally parallel.

3. The utility task vehicle according to claim 1, wherein said first axis and said second axis are arranged at an angle to each other, said angle being less than or equal to about 15 degrees.

4. The utility task vehicle according to claim 1, wherein said window assembly is disposed vertically above said first door.

5. The utility task vehicle according to claim 1, wherein said window assembly further includes a cover surrounding said frame.

6. The utility task vehicle of claim 5, wherein a portion of said cover is transformable between an extended configuration and a retracted configuration.

7. The utility task vehicle of claim 6, wherein in the retracted configuration said portion is at least partially separated from said cover to expose said opening.

8. The utility task vehicle according to claim 1, wherein said door includes a latch for selectively retaining said first door and said window assembly in said closed position.

9. The utility task vehicle according to claim 8, wherein when both said door and said window assembly are in said closed position, operation of said latch releases said door from a closed position such that both said door and said window assembly are rotatable from the closed position to the open position.

\* \* \* \* \*